(12) United States Patent
Kanno et al.

(10) Patent No.: US 12,153,516 B2
(45) Date of Patent: *Nov. 26, 2024

(54) MEMORY SYSTEM AND METHOD FOR CONTROLLING NONVOLATILE MEMORY

(71) Applicant: Kioxia Corporation, Tokyo (JP)

(72) Inventors: Shinichi Kanno, Tokyo (JP); Hideki Yoshida, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,547

(22) Filed: Sep. 13, 2023

(65) Prior Publication Data
US 2023/0418739 A1    Dec. 28, 2023

Related U.S. Application Data

(63) Continuation of application No. 17/499,825, filed on Oct. 12, 2021, now Pat. No. 11,797,436, which is a
(Continued)

(30) Foreign Application Priority Data
Sep. 21, 2017  (JP) .................. 2017-181425

(51) Int. Cl.
*G06F 12/02* (2006.01)
*G06F 3/06* (2006.01)

(52) U.S. Cl.
CPC ........ *G06F 12/0246* (2013.01); *G06F 3/0616* (2013.01); *G06F 3/064* (2013.01);
(Continued)

(58) Field of Classification Search
None
See application file for complete search history.

(56) References Cited

U.S. PATENT DOCUMENTS 8,364,918 B1    1/2013 Smith
9,378,135 B2    6/2016 Bennett
(Continued)

FOREIGN PATENT DOCUMENTS

CN    104679446 A    6/2015
CN    106874211 A    6/2017
(Continued)

OTHER PUBLICATIONS

Yiying Zhang et al., "De-indirection for Flash-based SSDs with Nameless Writes", 10th USENIX Conference on File and Storage Technologies (FAST '12), Feb. 14-17, 2012, pp. 1-16.
(Continued)

*Primary Examiner* — Kevin Verbrugge
(74) *Attorney, Agent, or Firm* — Maier & Maier, PLLC

(57) ABSTRACT

According to one embodiment, a memory system determine both of a first block to which data from a host is to be written and a first location of the first block, when receiving a write request to designate a first logical address from the host. The memory system writes the data from the host to the first location of the first block. The memory system notifies the host of the first logical address, a first block number designating the first block, and a first in-block offset indicating an offset from a leading part of the first block to the first location by a multiple of grain having a size different from a page size.

20 Claims, 25 Drawing Sheets

Related U.S. Application Data continuation of application No. 16/723,458, filed on Dec. 20, 2019, now Pat. No. 11,144,451, which is a continuation of application No. 15/913,987, filed on Mar. 7, 2018, now Pat. No. 10,545,862.

(52) U.S. Cl.
CPC .......... *G06F 3/0652* (2013.01); *G06F 3/0659* (2013.01); *G06F 3/067* (2013.01); *G06F 3/0679* (2013.01); *G06F 3/0688* (2013.01); *G06F 12/0253* (2013.01)

(56) References Cited

U.S. PATENT DOCUMENTS

| | | |
|---|---|---|
| 2006/0133155 A1 | 6/2006 | Fujita et al. |
| 2011/0296083 A1 | 12/2011 | Harasawa et al. |
| 2012/0246399 A1 | 9/2012 | Nishi et al. |
| 2013/0019057 A1 | 1/2013 | Stephens |
| 2013/0111298 A1 | 5/2013 | Seroff et al. |
| 2013/0246716 A1 | 9/2013 | Kato et al. |
| 2014/0208004 A1 | 7/2014 | Cohen et al. |
| 2017/0024137 A1 | 1/2017 | Kanno |
| 2017/0139600 A1 | 5/2017 | Ke |
| 2017/0168951 A1 | 6/2017 | Kanno |
| 2017/0262175 A1 | 9/2017 | Kanno |
| 2017/0262228 A1 | 9/2017 | Kanno |
| 2017/0270042 A1 | 9/2017 | Tseng et al. |
| 2020/0319798 A1 | 10/2020 | Gupta et al. |

FOREIGN PATENT DOCUMENTS

| | | |
|---|---|---|
| JP | 2011253250 A | 12/2011 |
| JP | 2013-097789 A | 5/2013 |
| JP | 2017-27387 A | 2/2017 |
| JP | 2017-162065 A | 9/2017 |
| JP | 2017-162068 A | 9/2017 |
| JP | 2017-168088 A | 9/2017 |
| TW | 201314437 A | 4/2013 |
| TW | 201719373 A | 6/2017 |
| WO | 2011068109 A1 | 6/2011 |
| WO | 2016/013076 A1 | 1/2016 |

OTHER PUBLICATIONS

Jian Huang et al., "FlashBlox: Achieving Both Performance Isolation and Uniform Lifetime for Virtualized SSDs," 15th USENIX Conference on File and Storage Technologies (FAST '17), Feb. 27-Mar. 2, 2017, pp. 375-390.

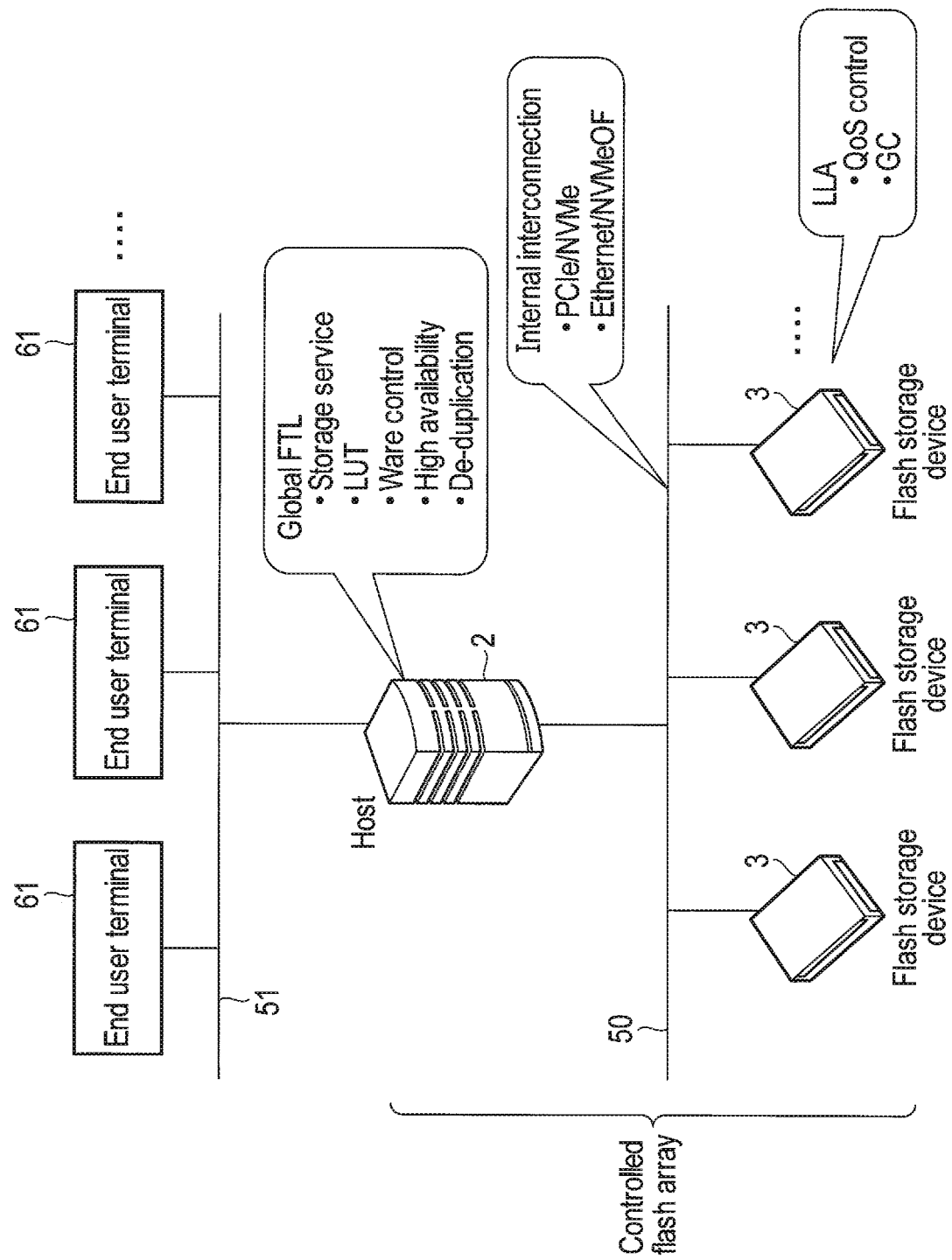
F I G. 1

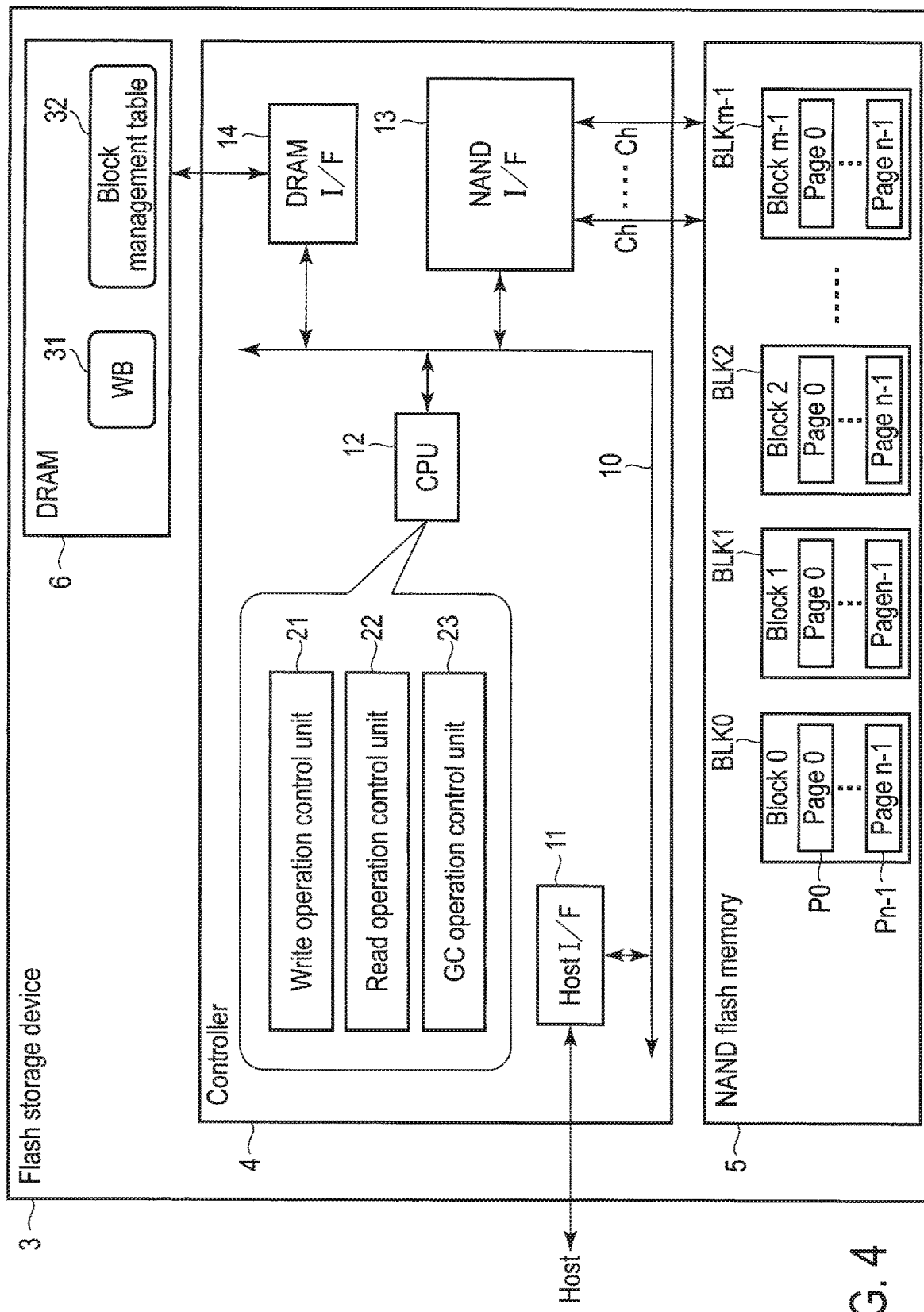
F I G. 4

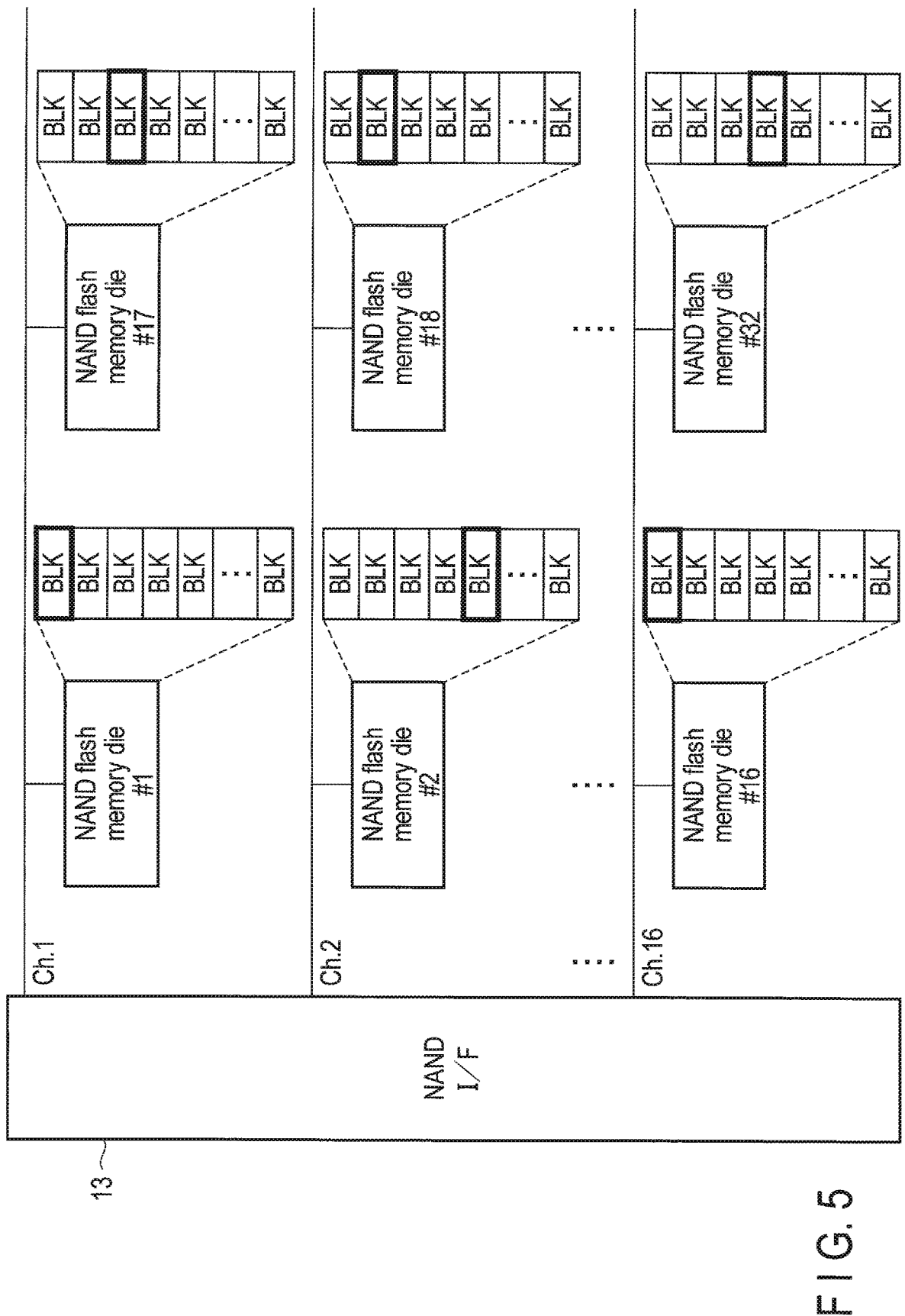
F I G. 5

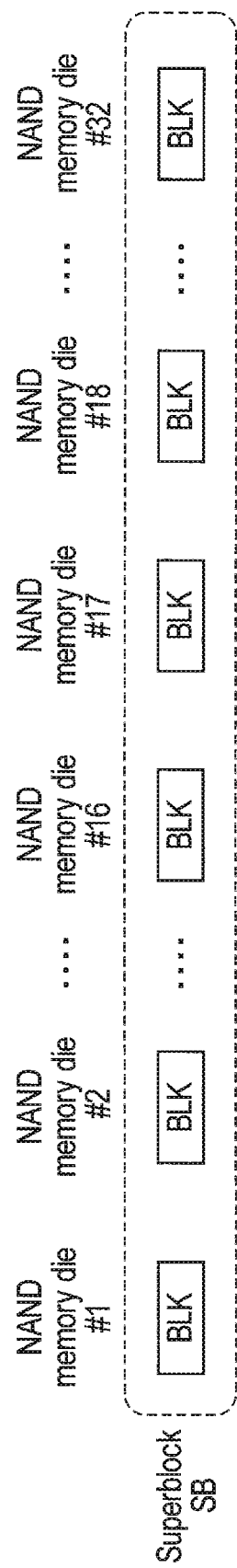
F I G. 6

Write command

| | Explanation |
|---|---|
| Command ID | Command ID for write command |
| QoS domain ID | Identifier to uniquely identify QoS domain to which data should be written |
| Logical address | Logical address is indicative of logical location to which data should be written |
| Length | Length of data which should be written (data length can be designated by number of grains) |

FIG. 7

Response to write command

| | Explanation |
|---|---|
| Logical address | Logical address included in write command |
| Physical address | Physical address is indicative of physical location to which data is written. Physical address is designated by block number and offset. |
| Length | Length of data written (data length can be designated by number of grains) |

FIG. 8

Trim command (can designate physical address)

| | Explanation |
|---|---|
| Command ID | Command ID for Trim command |
| Physical address | Physical address is indicative of first physical location in which data should be invalidated is stored. Physical address is designated by block number and offset. |
| Length | Length of data which should be invalidated (data length can be designated by number of grains) |

FIG. 9

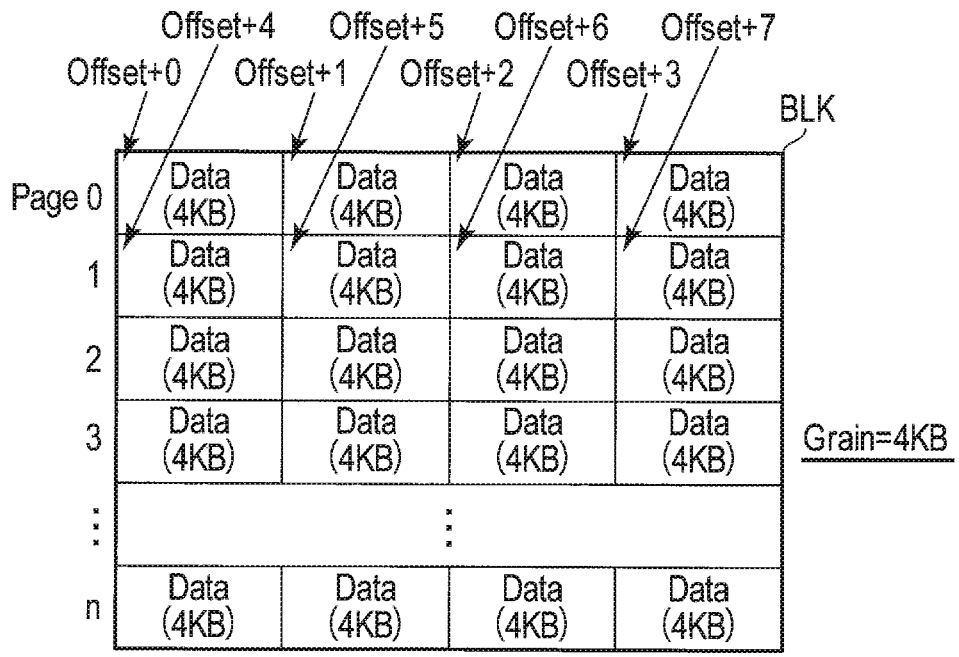
F I G. 10
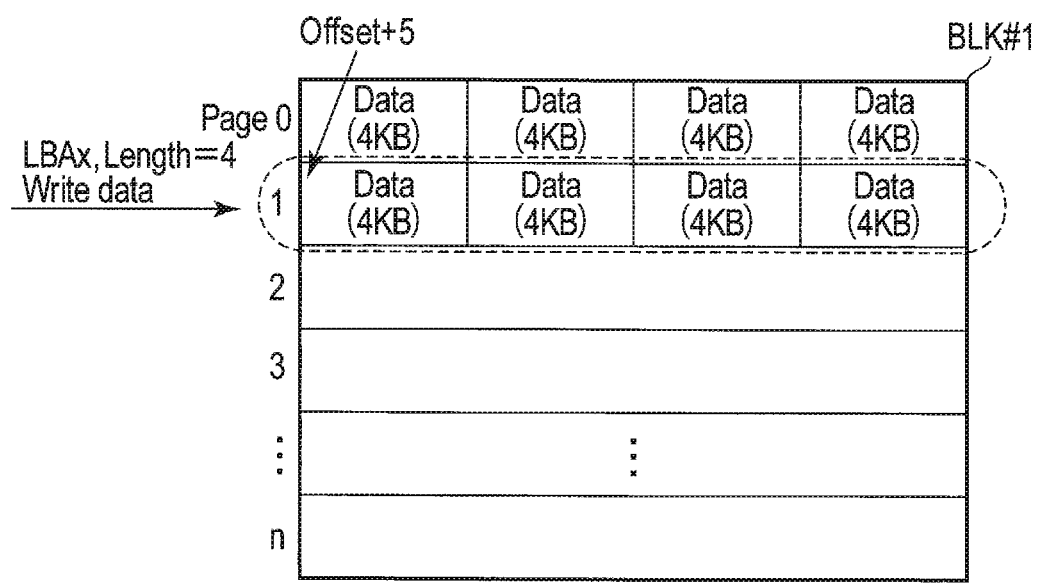
F I G. 11

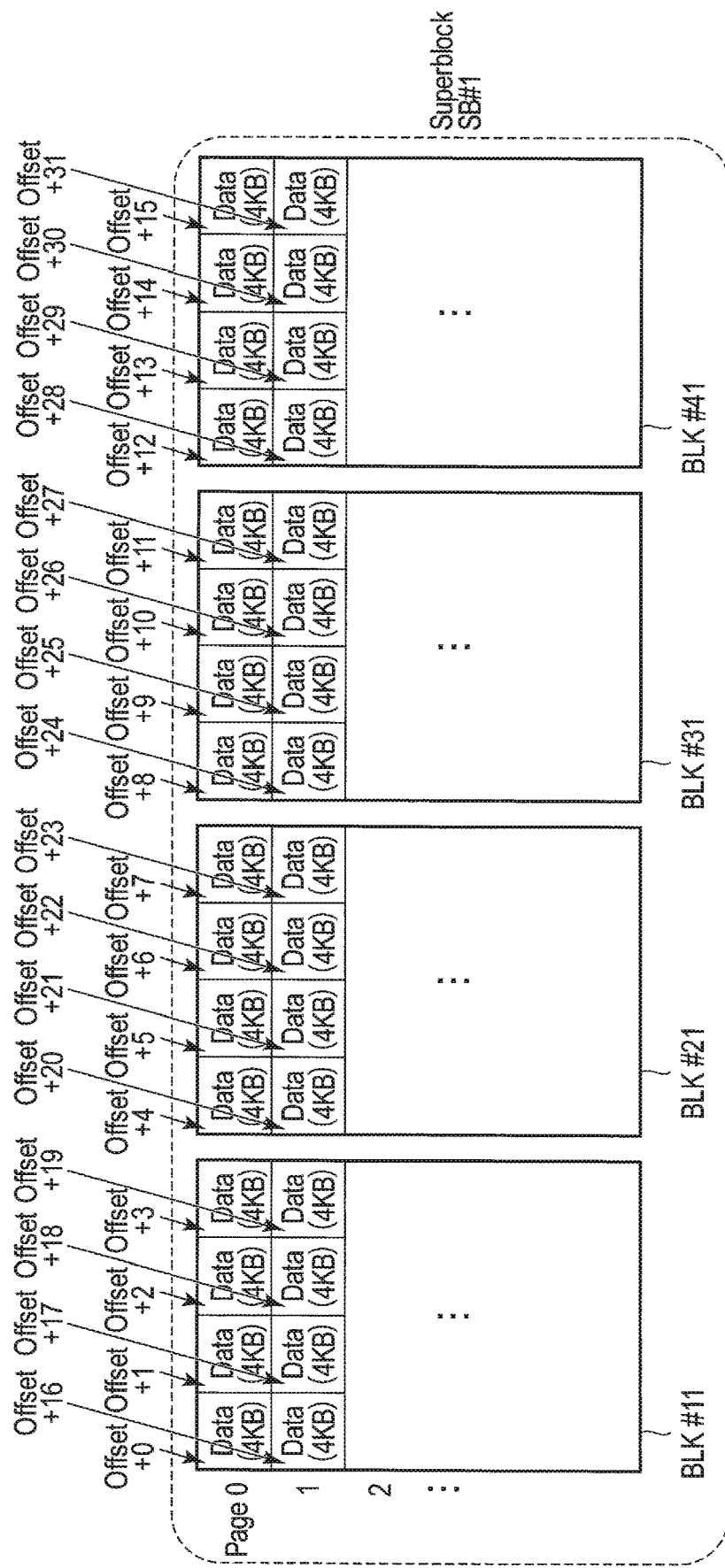
F I G. 16

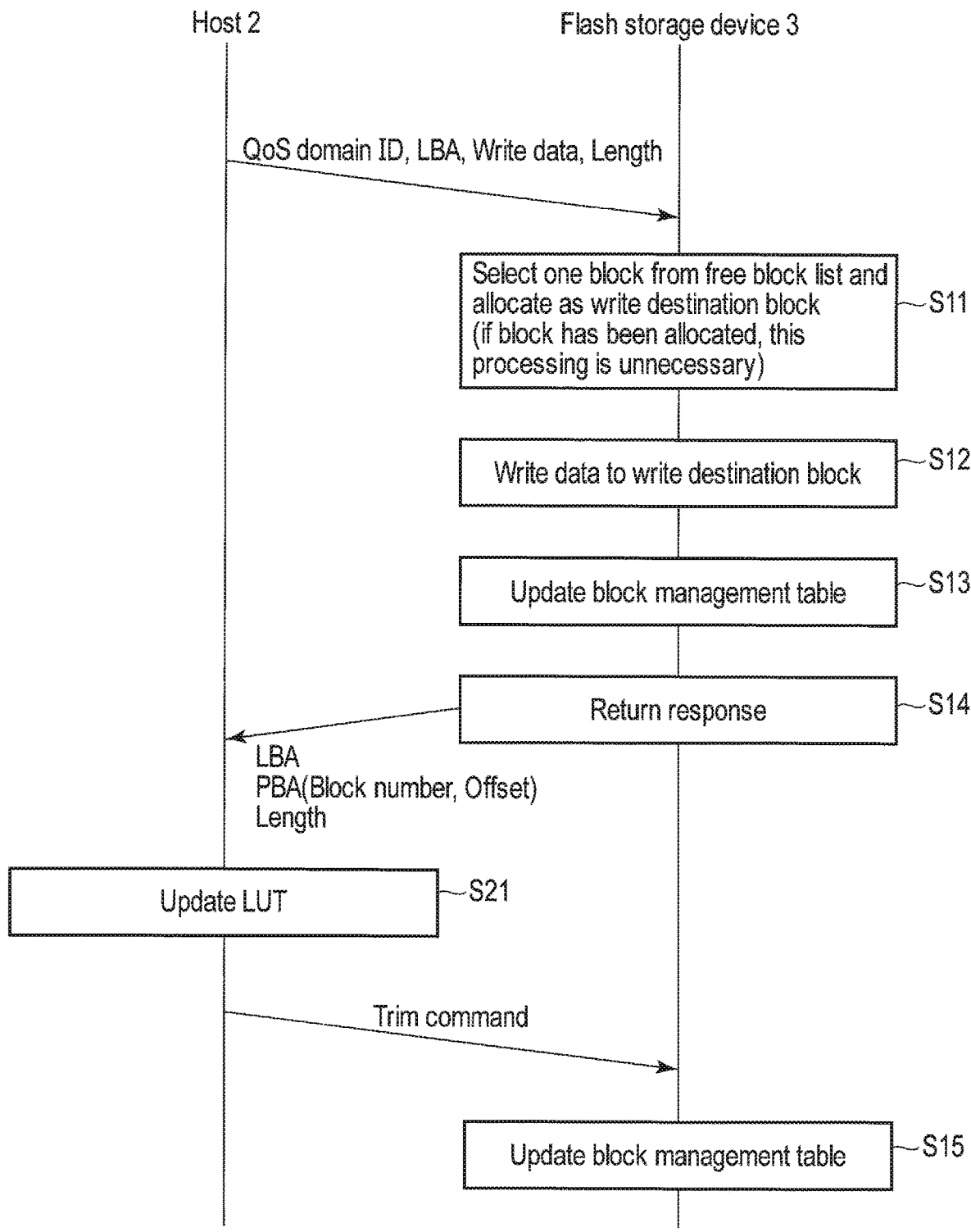
F I G. 17

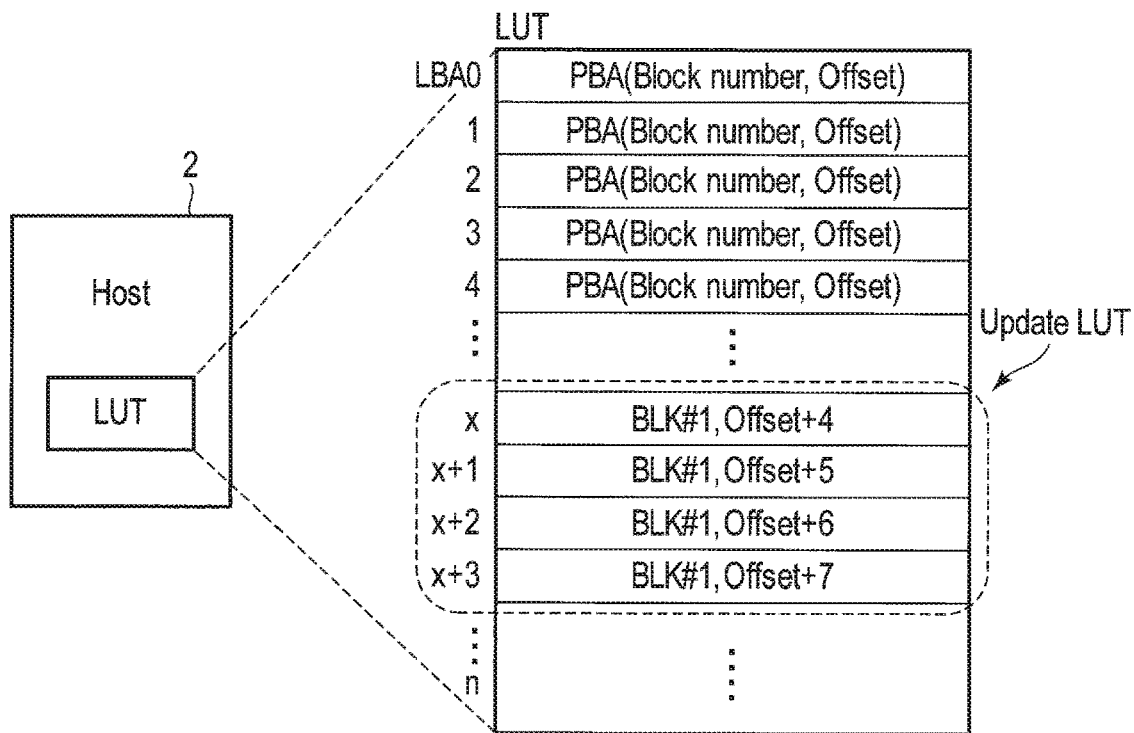
F I G. 20
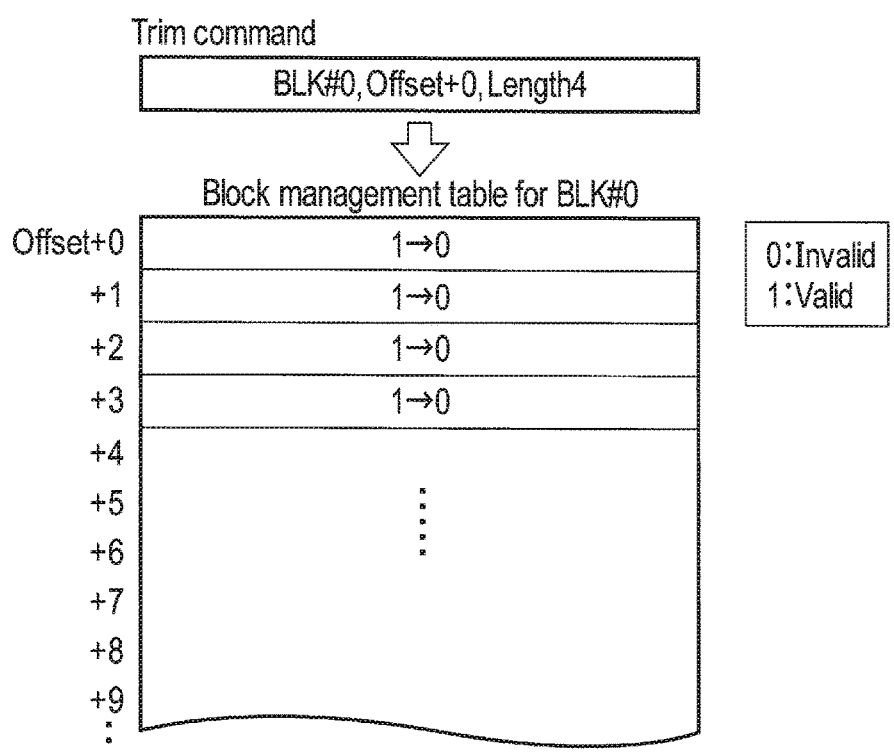
F I G. 21

Read command

| | Explanation |
|---|---|
| Command ID | Command ID for read command |
| Physical address (PBA) #1 | Physical address is indicative of a first physical location from which data should be read. Physical address is designated by block number and offset |
| Length #1 | Length of data which should be written (data length can be designated by number of grains) |
| Physical address (PBA) #2 | Physical address is indicative of a first physical location from which data should be read. Physical address is designated by block number and offset. |
| Length#2 | Length of data which should be written (data length can be designated by number of grains) |
| Transfer destination pointer | Location in host memory to which read data should be transferred |

F I G. 22

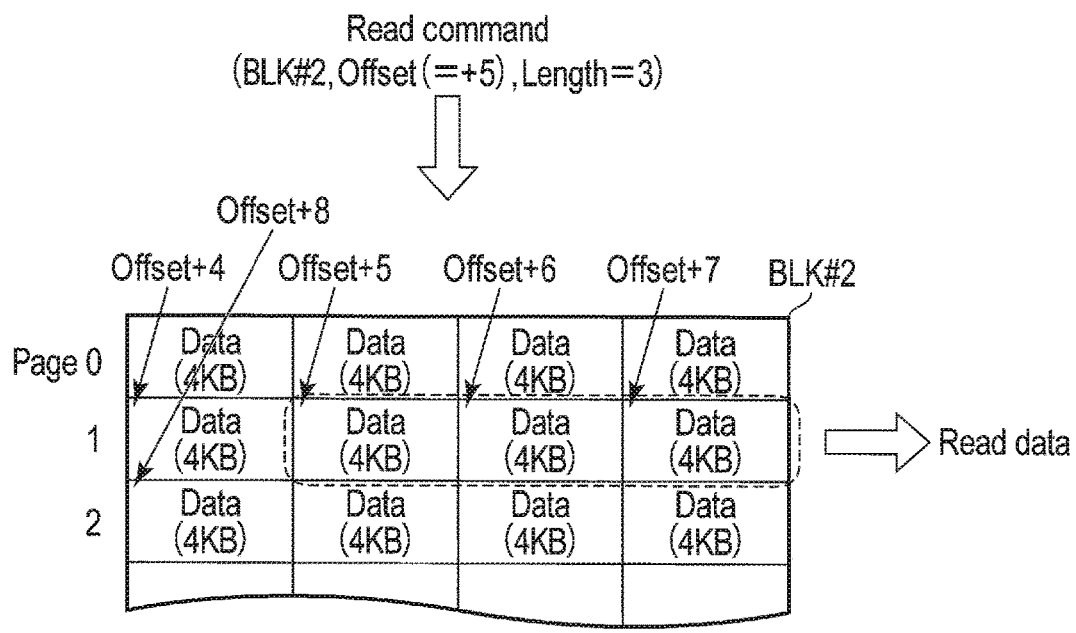

F I G. 23

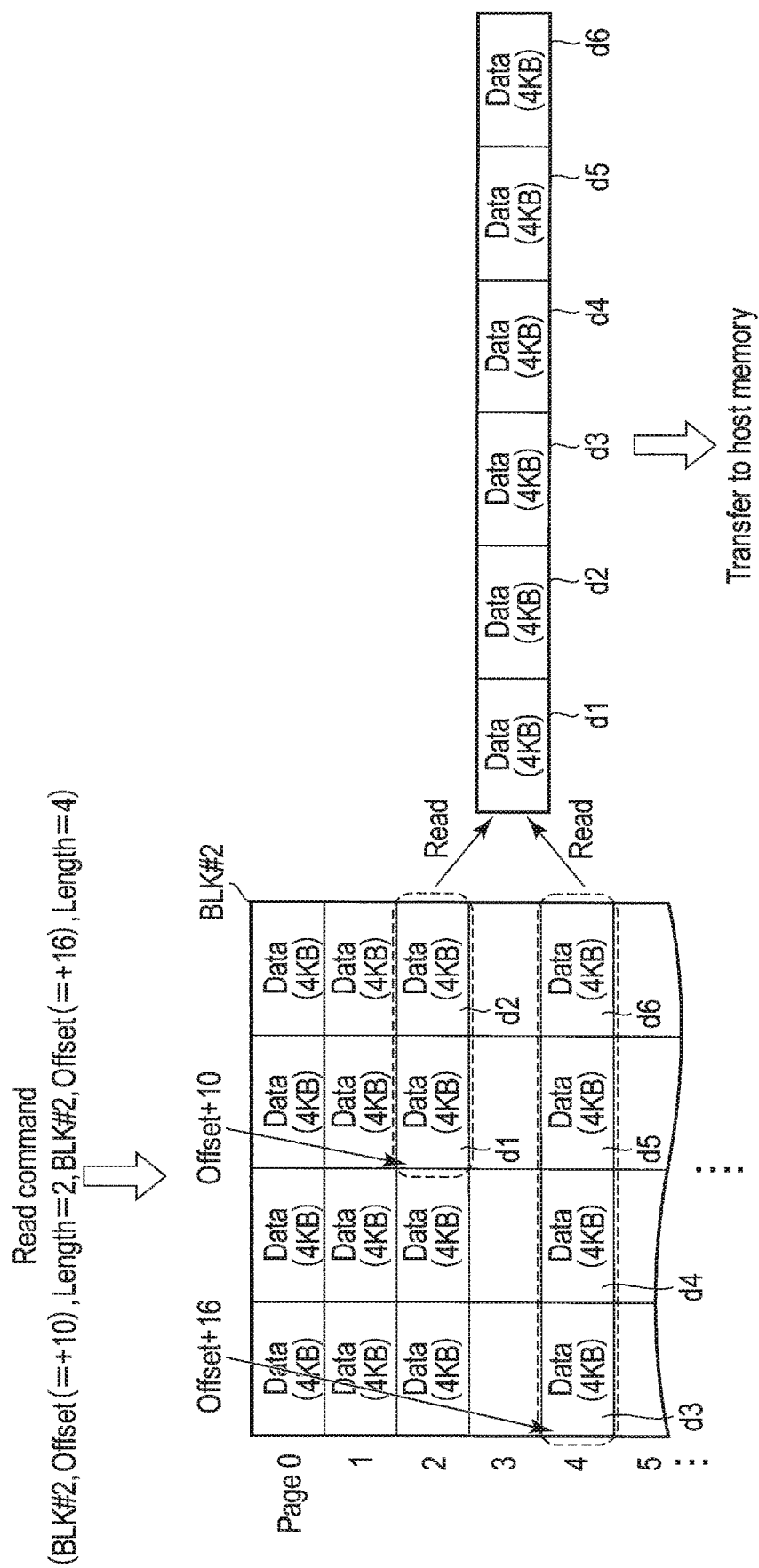
F I G. 24

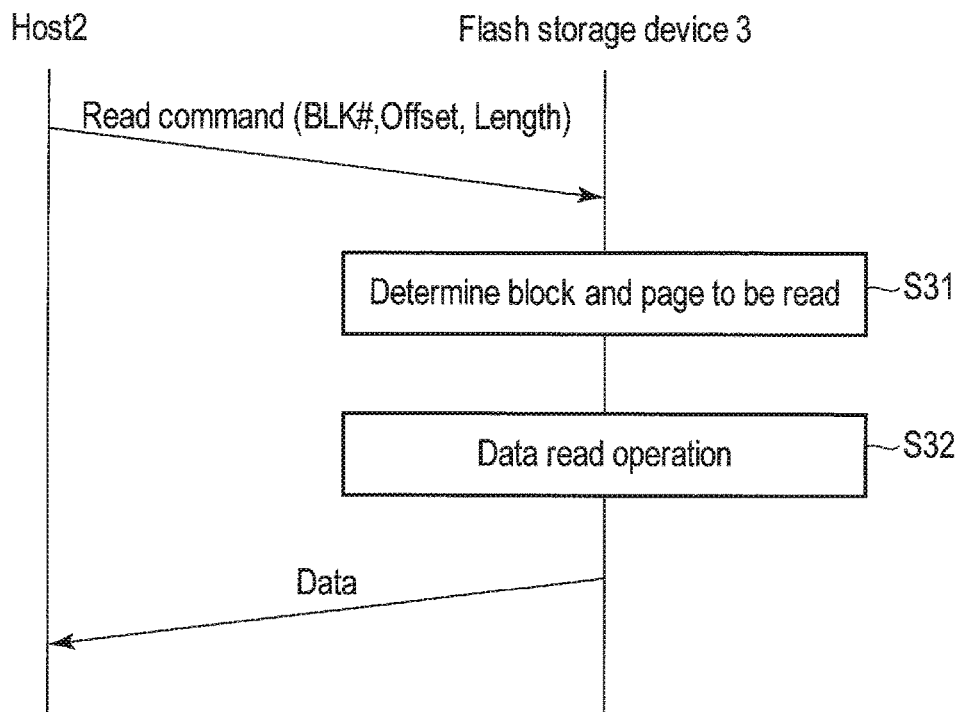

FIG. 25

GC control command

| | Explanations |
|---|---|
| Command ID | Command ID for GC control |
| Policy | Host can designate policy to select GC candidate block<br>Device supports a plurality of policies, and selects GC candidate block by using policy designated by host |
| Source QoS domain ID | Host can designate which QoS domain ID should be GC source |
| Destination QoS domain ID | Host can designate which QoS domain ID should be GC destination |

FIG. 26

Callback command for GC

|  | Explanations |
|---|---|
| Command ID | Command ID for GC callbac |
| Logical address | Logical address of copied valid data |
| Length | Length of copied valid data |
| Destination physical address | Destination physical address is indicative of location in GC destination block in which valid data is copied. Destination physical address can be designated by block number and offset |
| (Optional) Source physical address | Source physical address is indicative of location in GC source block in which valid data has been stored. Source physical address can be designated by block number and offset. Host can be notified of a set of logical address, destination physical address, and source physical address |

F I G. 27

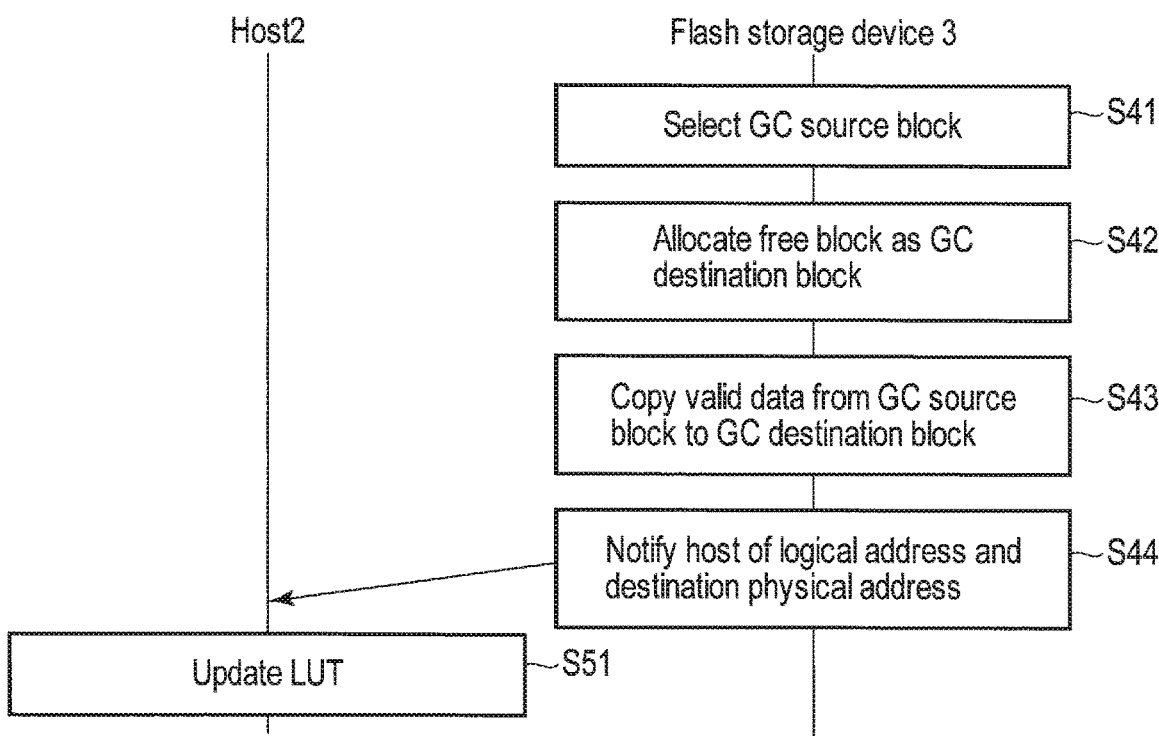

F I G. 28

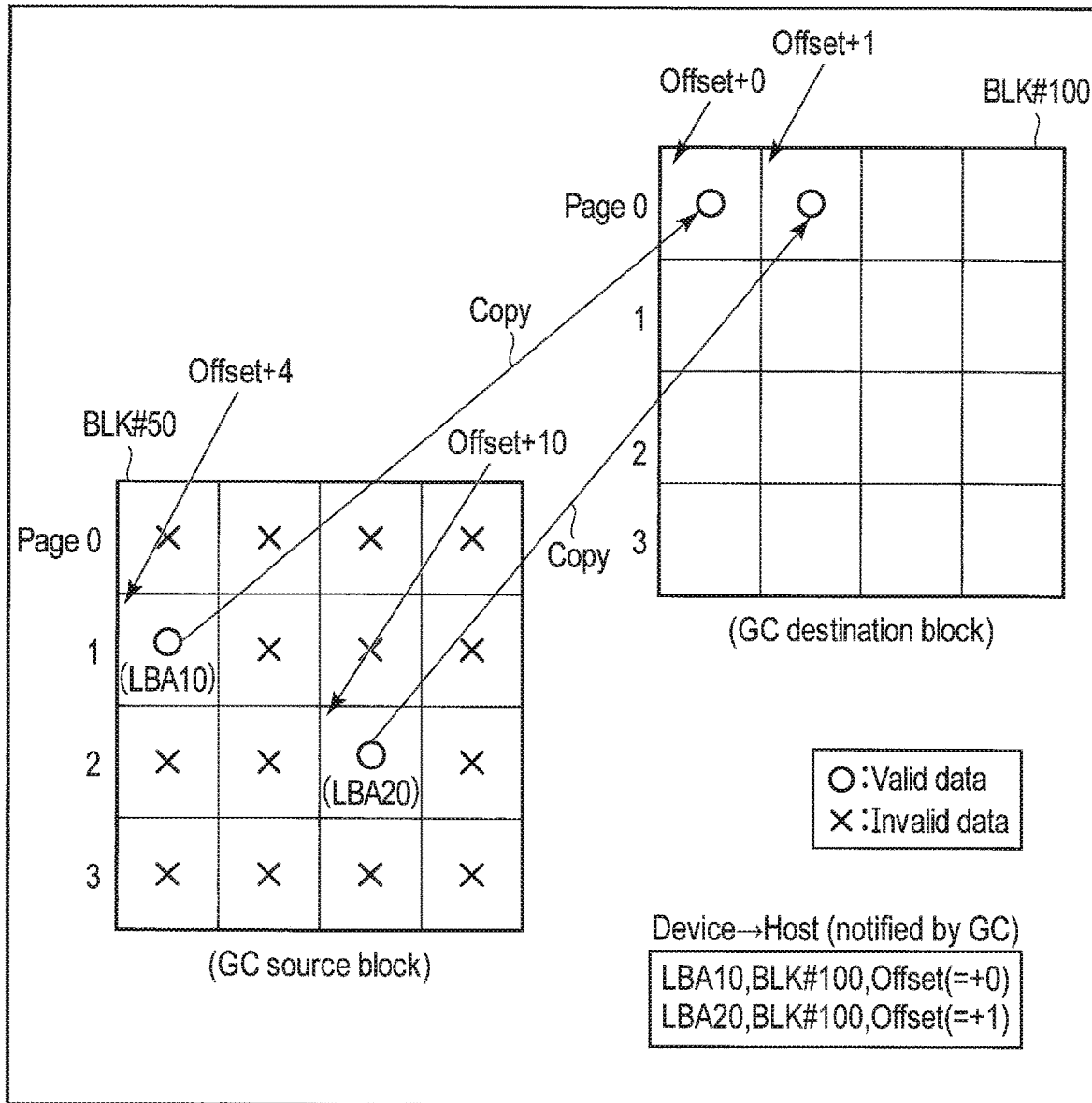
F I G. 29

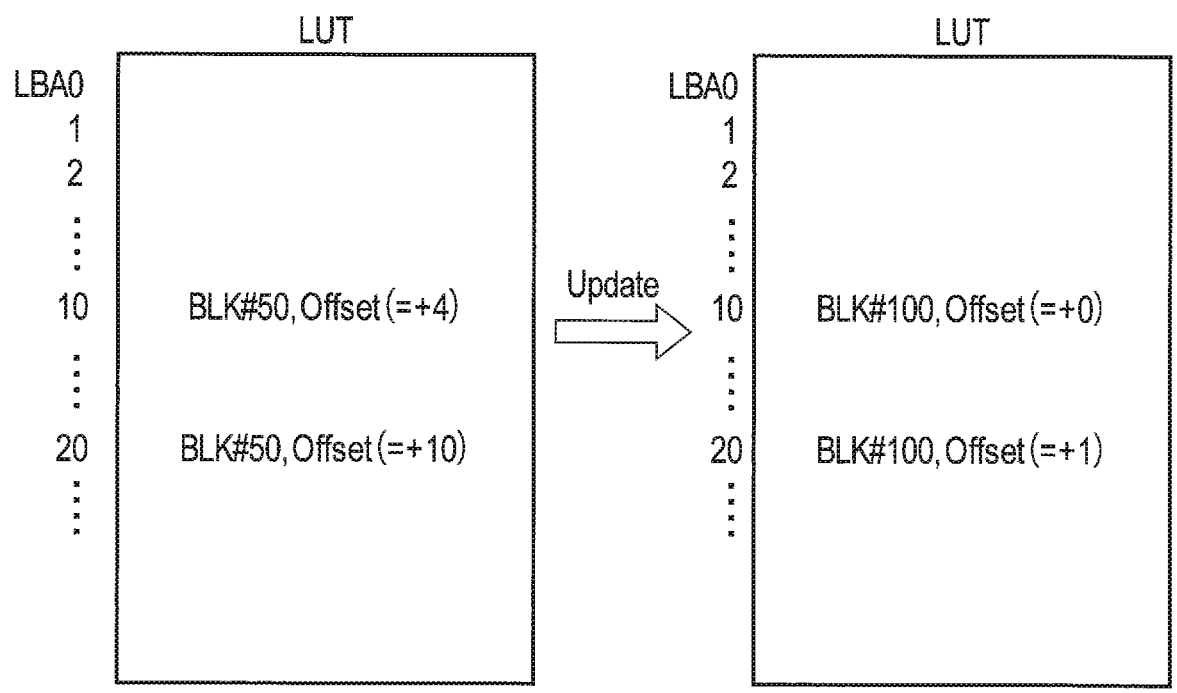
F I G. 30

GC control command

|  | Explanations |
|---|---|
| Command ID | Command ID for GC control |
| Policy | Host can designate policy to select GC candidate block<br>Device supports a plurality of policies, and selects GC candidate block by using policy designated by host |
| Source device ID / Source QoS domain ID | Host can designate which device should be GC source<br>In addition, host can designate which QoS domain ID should be GC source |
| Destination device ID / Destination QoS domain ID | Host can designate which device should be GC destination<br>In addition, host can designate which QoS domain ID should be GC destination. |

F I G. 32

Callback command for GC

|  | Explanations |
|---|---|
| Command ID | Command ID for callback for GC |
| Logical address | Logical address of copied valid data |
| Length | Length of copied valid data |
| Destination device ID / Destination physical address | Destination device ID is indicative of device in which valid data is copied<br>Destination physical address is indicative of location in GC destination block in which valid data is copied. Destination physical address can be designated by block number and offset |
| (Optional) Source device ID / Source physical address | Source device ID is indicative of device in which valid data is stored<br>Source physical address is indicative of location in GC source block in which valid data is stored. Source physical address can be designated by block number and offset. Host can be notified of a set of logical address, destination physical address, and source physical address |

F I G. 33

Block management table for BLK#1

| Offset | Value |
|---|---|
| +0 | 1 (Reference count) |
| +1 | 4 |
| +2 | 2 |
| +3 | 3 |
| +4 | 5 |
| +5 | 6 |
| +6 | 0 |
| ⋮ | ⋮ |

Invalid: Reference count=0
Valid: Reference count≧1

F I G. 35

Duplicate command (capable of designating physical address)

|  | Explanations |
|---|---|
| Command ID | Command ID for duplicate command |
| Physical address (PBA) | Physical address is indicative of first physical location storing data in which reference count should be incremented by 1. Physical address is designated by block number and offset |
| Length | Length of data in which reference count should be incremented by 1 (data length can be designated by number of grains) |

F I G. 36

Duplicate command (capable of designating physical address)

|  | Explanations |
|---|---|
| Command ID | Command ID for Trim command |
| Physical address (PBA) | Physical address is indicative of first physical location storing data in which reference count should be decremented by 1. Physical address is designated by block number and offset |
| Length | Length of data in which reference count should be decremented by 1 (data length can be designated by number of grains) |

F I G. 37

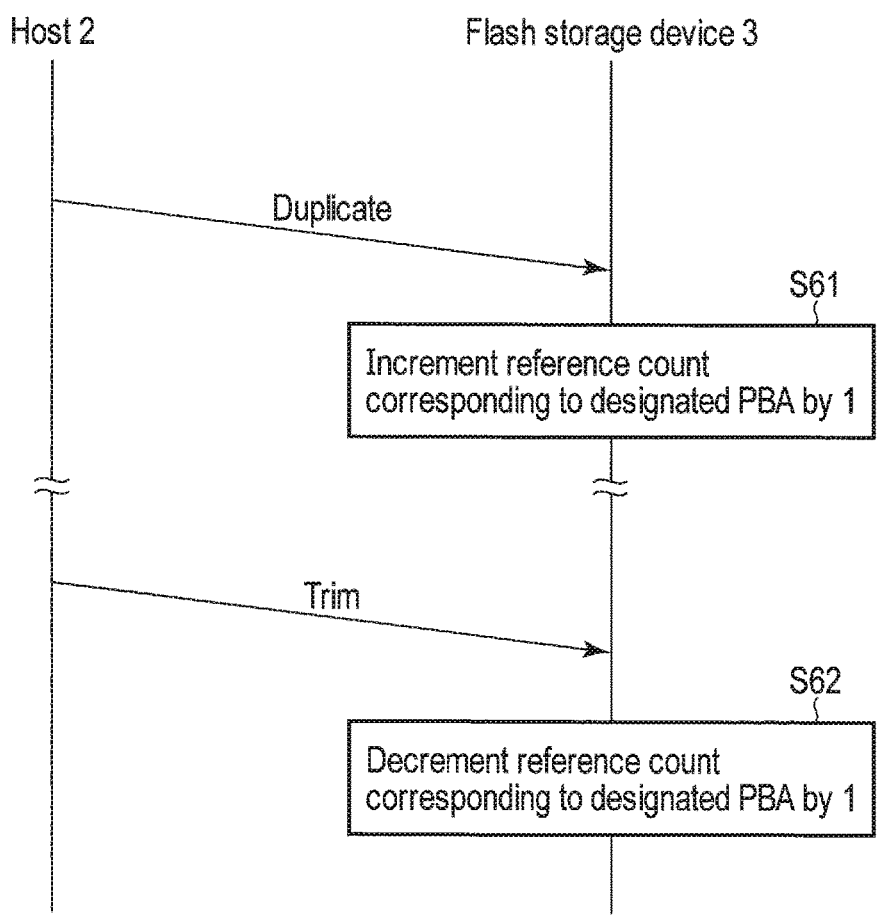

F I G. 38

MEMORY SYSTEM AND METHOD FOR CONTROLLING NONVOLATILE MEMORY

CROSS-REFERENCE TO RELATED APPLICATIONS

This application is a continuation of application Ser. No. 17/499,825 filed Oct. 12, 2021, which is a continuation of application Ser. No. 16/723,458 filed Dec. 20, 2019 (now U.S. Pat. No. 11,144,451), which is a continuation of application Ser. No. 15/913,987 filed Mar. 7, 2018 (now U.S. Pat. No. 10,545,862) and is based upon and claims the benefit of priority from Japanese Patent Application No. 2017-181425, filed Sep. 21, 2017, the entire contents of which are incorporated herein by reference.

FIELD

Embodiments described herein relate generally to technology of controlling a nonvolatile memory.

BACKGROUND

In recent years, memory systems comprising nonvolatile memories have been widely prevalent.

As such a memory system, a solid state drive (SSD) based on a NAND flash technology is known.

SSD is also used as the storage in a server of the data center. The storage used in a host computer such as a server is required to exert high-level I/O performance. For this reason, a new interface between a host and a storage has been recently proposed.

In general, however, since control of a NAND flash memory is complicated, appropriate role sharing between a host and a storage (memory system) is required to be considered for implementation of the new interface to improve the I/O performance.

BRIEF DESCRIPTION OF THE DRAWINGS

FIG. 1 is a block diagram showing a relationship between a host and a memory system (flash storage device) according to the embodiments.

FIG. 4 is a block diagram showing a configuration example of the memory system according to the embodiments.

FIG. 5 is a block diagram showing a relationship between a NAND interface and a plurality of NAND flash memory dies provided in the flash storage device according to the embodiments.

FIG. 6 is a block diagram showing a configuration example of a super block configured by a plurality of block sets.

FIG. 7 is a table for explanation of a write command applied to the flash storage device according to the embodiments.

FIG. 8 is a table for explanation of a response to a write command shown in FIG. 7.

FIG. 9 is a table for explanation of a Trim command applied to the flash storage device according to the embodiments.

FIG. 10 is a block diagram for explanation of block numbers and offsets which define a physical address included in the response shown in FIG. 8.

FIG. 11 is a table for explanation of a relationship between a write operation executed in response to a write command and a return value included in a response to the write command.

FIG. 16 is a block diagram for explanation of a relationship between block numbers and offsets in a case where a super block is used.

FIG. 17 is a sequence chart showing a sequence of write operation processing executed by the host and the flash storage device according to the embodiments.

FIG. 20 is a diagram for explanation of an operation of updating a lookup table (logical-to-physical address translation table) managed by the host.

FIG. 21 is a diagram for explanation of an operation of updating the block management table in response to a notification from the host indicative of a physical address corresponding to data which should be invalidated.

FIG. 22 is a table for explanation of the read command applied to the memory system according to the embodiments.

FIG. 23 is a diagram for explanation of a read operation executed by the flash storage device according to the embodiments.

FIG. 24 is a diagram for explanation of an operation of reading data portions stored in respective different physical locations in response to the read command from the host.

FIG. 25 is a sequence chart showing a sequence of reading executed by the host and the flash storage device according to the embodiments.

FIG. 26 is a table for explanation of a garbage collection (GC) control command applied to the flash storage device according to the embodiments.

FIG. 27 is a table for explanation of a callback command for GC applied to the flash storage device according to the embodiments.

FIG. 28 is a sequence chart showing a procedure of the garbage collection (GC) operation executed by the flash storage device according to the embodiments.

FIG. 29 is a diagram for explanation of an example of a data copy operation executed for the garbage collection (GC).

FIG. 30 is an illustration for explanation of contents of a lookup table of the host updated based on a result of the data copy operation shown in FIG. 29.

FIG. 32 is a table for explanation of another example of the garbage collection (GC) control command applied to the flash storage device according to the embodiments.

FIG. 33 is a table for explanation of another example of the callback command for GC applied to the flash storage device according to the embodiments.

FIG. 35 is a diagram showing a configuration example of the block management table for management of a reference count.

FIG. 36 is a table for explanation of a duplicate command applied to the flash storage device according to the embodiments.

FIG. 37 is a table for explanation of a Trim command to reduce the reference count by 1.

FIG. 38 is a sequence chart showing reference count increment/decrement processing executed by the host and the flash storage device according to the embodiments.

DETAILED DESCRIPTION

Figure 2:
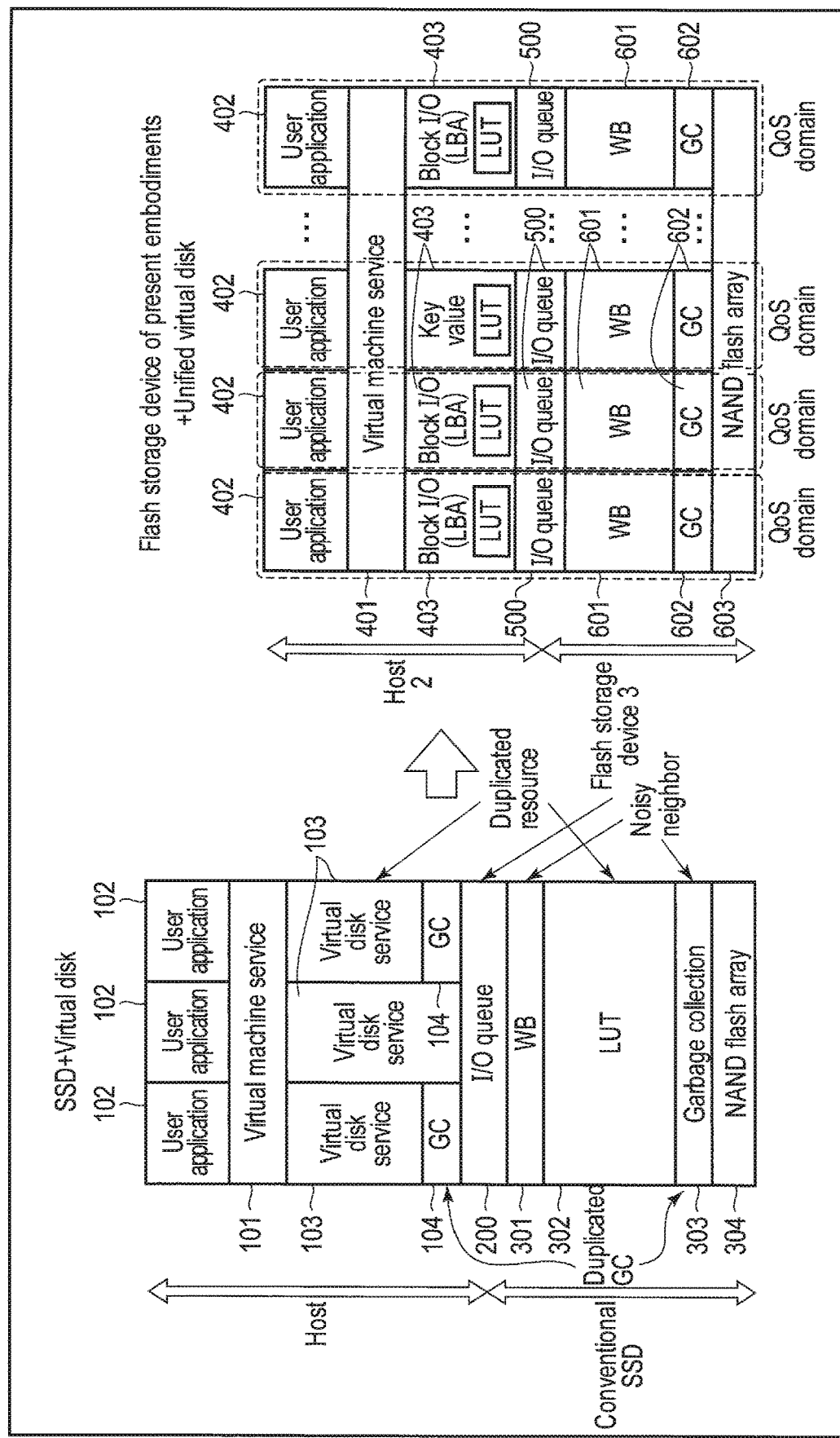
FIG. 2 is a block diagram for explanation of role sharing between conventional SSD and a host, and role sharing between the flash storage device according to the embodiments and the host.

Various embodiments will be described hereinafter with reference to the accompanying drawings.

In general, according to one embodiment, a memory system connectable to a host, comprises a nonvolatile memory including a plurality of blocks each including a plurality of pages, and a controller electrically connected to the nonvolatile memory to control the nonvolatile memory.

When receiving a write request to designate a first logical address from the host, the controller determines both of a first block to which data from the host is to be written and a first location of the first block, writes the data from the host to the first location of the first block, and to notifies the host of the first logical address, a first block number designating the first block, and a first in-block offset indicating an offset from a leading part of the first block to the first location by a multiple of grain having a size different from a page size.

When executing garbage collection of the nonvolatile memory, the controller selects a copy source block and a copy destination block for the garbage collection from the plurality of blocks, determines a second location of the copy destination block to which valid data stored in the copy source block is to be written, copies the valid data to the second location of the copy destination block, and notifies the host of a logical address of the valid data, a second block number designating the copy destination block, and a second in-block offset indicating an offset from a leading part of the copy destination block to the second location by a multiple of the grain.

First, a configuration of a computing system including a memory system according to one embodiment will be described with reference to FIG. 1.

The memory system is a semiconductor storage device configured to write data to a nonvolatile memory and to read data from the nonvolatile memory. The memory system is implemented as a flash storage device 3 based on the NAND flash technology.

The computing system may include a host (host device) 2 and a plurality of flash storage devices 3. The host 2 may be a server configured to use a flash array composed of a plurality of flash storage devices 3 as a storage. The host (server) 2 and the flash storage devices 3 are interconnected via an interface 50 (internal interconnection). The interface 50 for the internal interconnection is not limited to this, but PCI Express (PCIe) (registered trademark), NVM Express (NVMe) (registered trademark), Ethernet (registered trademark), NVMe over Fabrics (NVMeOF), and the like can be used as the interface.

A typical example of a server which functions as the host 2 is a server in a data center.

In a case where the host 2 is implemented by the server in the data center, the host (server) 2 may be connected to a plurality of end user terminals (clients) 61 via a network 51. The host 2 can provide various services to the end user terminals 61.

Examples of services which can be provided by the host (server) 2 are (1) Platform as a Service (PaaS) which provides a system running development platform to each client (each end user terminal 61), (2) Infrastructure as a Service (IaaS) which provides an infrastructure such as a virtual server to each client (each end user terminal 61), and the like.

A plurality of virtual machines may be executed on a physical server which functions as the host (server) 2. Each of the virtual machines running on the host (server) 2 can function as a virtual server configured to provide various services to several corresponding clients (end user terminals 61).

The host (server) 2 comprises a storage management function of managing a plurality of flash storage devices 3 constituting a flash array, and a front-end function of providing various services including the storage access to the end user terminals 61.

In the conventional SSD, a block/page hierarchical structure of a NAND flash memory is hidden by a flash translation layer (FTL) in SSD. In other words, FTL of the conventional SSD comprises (1) the function of managing mapping between each of the logic addresses and each of the physical addresses of the NAND flash memory, by using the lookup table which functions as the logical-to-physical address translation table, (2) the function of hiding read/write in page units and the erase operation in block units, (3) the function of executing the garbage collection (GC) of the NAND flash memory, and the like. Mapping between the logical addresses and physical addresses of the NAND flash memory cannot be seen from the host. The block/page structure of the NAND flash memory cannot be seen from the host either.

In the host, too, a type of address translation (application-level address translation) is often executed. This address translation manages mapping between each of the logical addresses for application and each of the logical addresses for SSD, using the application-level address translation table. In addition, in the host, too, a type of GC (application-level GC) for change of data placement in the logical address space is executed for eliminating of fragments which occur in the logical address space for SSD.

In a redundant configuration in which each of the host and SSD includes the address translation table (SSD includes the lookup table which functions as the logical-to-physical address translation table while the host includes the application-level address translation table), however, enormous volumes of memory resources are consumed to hold these address translation tables. Furthermore, double address translation including the address translation on the host side and the address translation on the SSD side is also a factor which degrades the I/O performance.

Furthermore, the application-level GC on the host side becomes a factor which increases the amount of data written to SSD to a multiple (for example, double) of the actual user data amount. Such increase of the data write amount does not increase write amplification of SSD, but degrades the storage performance of the whole system and shortens the life of SSD.

A measure of moving all the functions of FTL of the conventional SSD to the host in order to solve this problem has also been proposed.

To take this measure, however, the host needs to directly handle blocks and pages of the NAND flash memory. The capacities of the NAND flash memories have increased for each generation of the NAND flash memory and, in accordance with this, the block sizes/page sizes of the NAND flash memories are different in each generation. For this reason, it is conceived that the NAND flash memories of different block sizes/page sizes may be used together in the host 2. Handling different block sizes/page sizes is difficult for the host. In addition, since an unexpected number of defective pages (bad pages) that would be generated for various reasons in manufacturing may exist, it is conceived that the number of substantially available pages in the blocks may be different for each block, and the block sizes in the NAND flash memory may also be different in each block. Handling the bad pages and nonuniform block sizes is further difficult for the host.

Thus, in the present embodiments, the role of FTL is shared by the host 2 and the flash storage device 3. The host 2 manages the lookup table which functions as the logical-to-physical address translation table, but selection of the block which should be used for writing is executed by not the host 2, but the flash storage device 3. In addition, GC is executed by not the host 2, but the flash storage device 3. The FTL function moved to the host 2 is hereinafter called global FTL.

The global FTL of the host 2 may comprise a function of executing a storage service, a function of managing the lookup table (LUT), a wear control function, a function of implementing high availability, a de-duplication function of preventing a plurality of duplicated data parts having the same contents from being stored in a storage, and the like.

In contrast, the flash storage device 3 can execute low-level abstraction (LLA). LLA is a function for abstraction of the NAND flash memory. LLA includes absorption of non-uniformity in block size, absorption of the block/size structure, a function of assisting data placement, and the like. The function of assisting the data placement includes a function of determining a copy source block and a copy destination block, a function of notifying an upper layer (host 2) of a copy destination location of valid data, a function of determining a user data write destination location (i.e., the block number and the location in the block), a function of notifying the upper layer (host 2) of the write destination location (i.e., the block number and the location in the block) in which the user data is written, and the like. In addition, LLA has a function of executing GC. Furthermore, LLA also comprises a QoS control function of executing resource management of the flash storage device 3 for each domain (QoS domain).

The QoS control function includes a function of determining the access unit for each QoS domain (or each block). The access unit is indicative of the minimum data size (grain) which the host 2 can write/read. The flash storage device 3 supports a single or a plurality of access units (grains) and, if the flash storage device 3 supports the plural access units, the host 2 can instructs a certain access unit which should be used for each QoS domain (or each block) to the flash storage device 3.

In addition, the QoS control function includes a function of preventing performance interference between the QoS domains. This function is basically a function of maintaining stable latency.

To implement this, the flash storage device 3 may classify a plurality of blocks in the NAND flash memory into a plurality of groups such that each of the blocks in the NAND flash memory belongs to only one group. In this case, each group includes blocks but the same block is not shared by different groups. These groups function as the above-explained QoS domains.

Alternatively, the flash storage device 3 may classify a plurality of NAND flash memory dies in the flash storage device 3 into the groups (QoS domains) such that each of the NAND flash memory dies in the flash storage device 3 belongs to only one group (one QoS domain). In this case, each group (QoS domain) includes the dies but the same die is not shared by different QoS domains.

FIG. 2 shows role sharing between the host and the conventional SSD, and role sharing between the host 2 and the flash storage device 3 according to the present embodiments.

The left part of FIG. 2 shows a hierarchical structure of the whole computing system including the conventional SSD and the host executing virtual disk services.

In the host (server), a virtual machine service 101 for providing a plurality of virtual machines to a plurality of end users is executed. In each of the virtual machines on the virtual machine service 101, an operating system and user applications 102 used by the corresponding end users are executed.

In addition, in the host (server), a plurality of virtual disk services 103 corresponding to the user applications 102 are executed. Each of the virtual disk services 103 allocates a part of the capacity of the storage resource in the conventional SSD as the storage resource (virtual disk) for the corresponding user application 102. In each of the virtual disk services 103, application-level address translation which translates the application-level logical address into the logical address for SSD is also executed by using the application-level address translation table. Furthermore, in the host, application-level GC 104 is also executed.

Transmission of the command from the host (server) to the conventional SSD and return of a response of command completion from the conventional SSD to the host (server) are executed via an I/O queue 200 which exists in each of the host (server) and the conventional SSD.

The conventional SSD comprises a write buffer (WB) 301, a lookup table (LUT) 302, a garbage collection function 303, and a NAND flash memory (NAND flash array) 304. The conventional SSD manages only one lookup table (LUT) 302, and resources of the NAND flash memory (NAND flash array) 304 are shared by the virtual disk services 103.

In this configuration, write amplification becomes large by duplicated GC including the application-level GC 104 under the virtual disk services 103 and the garbage collection function 303 (LUT-level GC) in the conventional SSD. In addition, in the conventional SSD, the noisy neighbor issue that the frequency of GC increases by the increase in data write amount from a certain end user or a certain virtual disk service 103 and the I/O performance for the other end user or the other disk service 103 may be thereby degraded, may occur.

In addition, a number of memory resources are consumed due to the existence of duplicated resource including the application-level address translation table in each virtual disk service and the LUT 302 in the conventional SSD.

The right part of FIG. 2 shows a hierarchical structure of the whole computing system including the host 2 and the flash storage device 3 according to the present embodiments.

In the host (server) 2, a virtual machine service 401 for providing a plurality of virtual machines to a plurality of end users is executed. In each of the virtual machines on the virtual machine service 401, an operating system and user applications 402 used by the corresponding end users are executed.

In addition, in the host (server) 2, a plurality of I/O services 403 corresponding to user applications 402 are executed. The I/O services 403 may include LBA-based block I/O service, key-value store service, and the like. Each of the I/O services 403 includes a lookup table (LUT) which manages mapping between each of the logical addresses and each of the physical addresses of the flash storage device 3. The logical address is indicative of an identifier which can identify data to be accessed. The logical address may be the logical block address (LBA) which designates a location in the logical address space or a key (tag) of the key-value store.

In the LBA-based block I/O service, LUT which manages mapping between each of the logical addresses (LBAs) and each of the physical addresses of the flash storage device 3 may be used.

In the key-value store service, LUT which manages mapping between each of the logical addresses (i.e., tags such as keys) and each of the physical addresses of the flash storage device 3 in which the data corresponding to the logical addresses (i.e., tags such as keys) are stored may be used. In LUT, correspondence among the tag, the physical address at which data identified by the tag is stored, and a data length of the data may be managed.

Each of the end users can select an addressing method (LBA, a key of the key-value store, or the like) which should be used.

Each LUT does not translate each of the logical addresses from the user application 402 into each of the logical addresses for the flash storage device 3, but translates each of the logical addresses from the user application 402 into each of the physical addresses of the flash storage device 3. In other words, each LUT is a table in which the table for translation of the logical address for the flash storage device 3 into the physical address and the application-level address translation table are integrated (merged).

In the host (server) 2, the I/O service 403 exists for each of the QoS domains. The I/O service 403 belonging to a certain QoS domain manages mapping between each of the logical addresses used by the user application 402 in the corresponding QoS domain and each of the physical addresses belonging to the resource group allocated to the corresponding QoS domain.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3. The I/O queues 500 may also be classified into a plurality of queue groups corresponding to the QoS domains.

The flash storage device 3 comprises a plurality of write buffers (WB) 601 corresponding to the QoS domains, a plurality of garbage collection (GC) functions 602 corresponding to the QoS domains, and the NAND flash memories (NAND flash array) 603.

In the configuration illustrated at the right part of FIG. 2, the amount of memory resource consumed to store the address translation information can be reduced since the LUT 302 in the conventional SSD and the application-level address translation table are merged as one LUT in the I/O service 403. In addition, since the number of address translation stages is reduced, the I/O performance can be improved.

Furthermore, not the duplicated GC including the application-level GC and the LUT-level GC, but the only flash storage device 3 executes the data copy for GC (unified GC). The write amplification of the whole system can be therefore reduced remarkably as compared with the configuration in which the duplicated GC is executed. As a result, the I/O performance can be improved and the life of the flash storage device 3 can be maximized.

Figure 3:
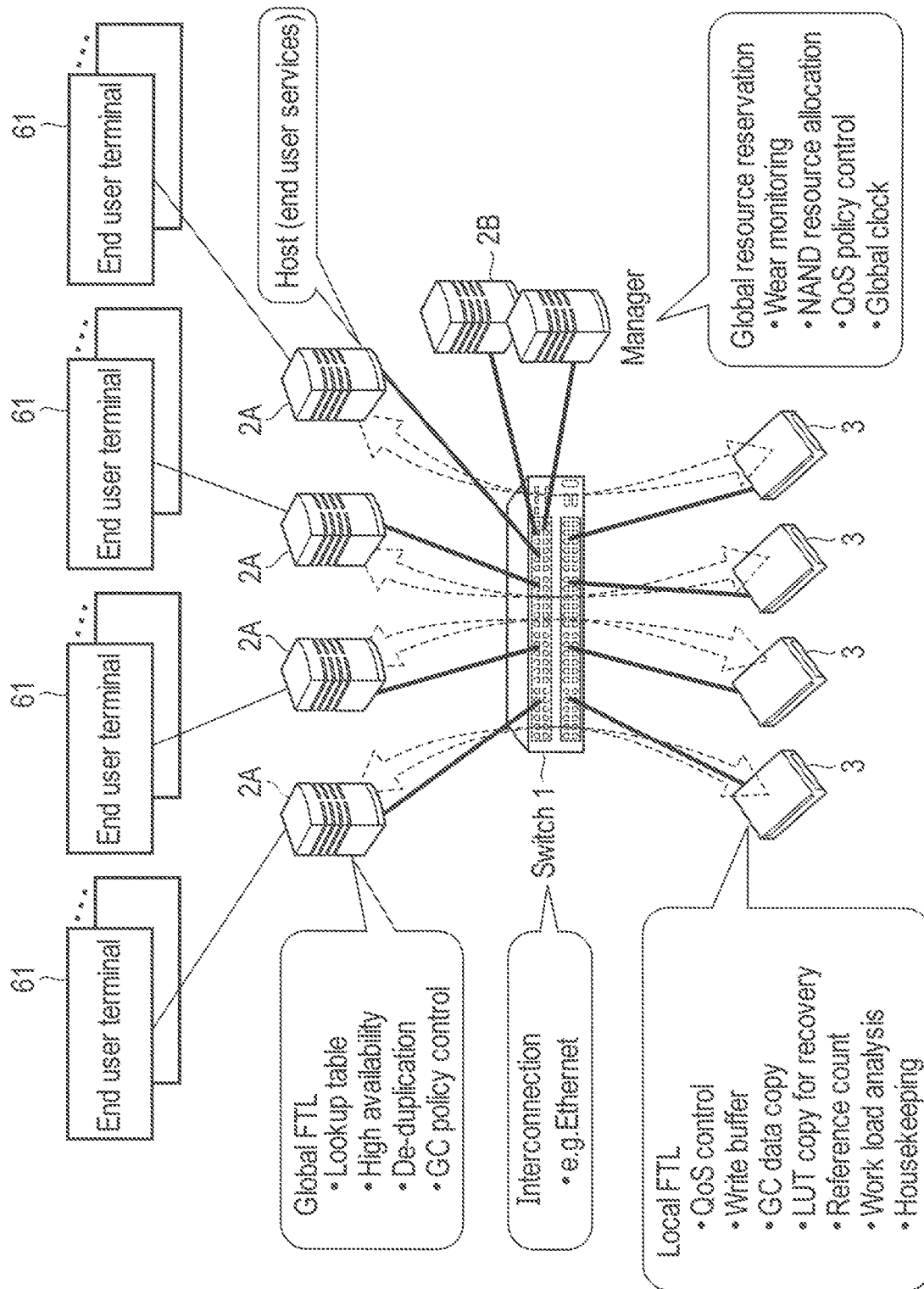
FIG. 3 is a block diagram showing a configuration example of a computing system in which data transfer between a plurality of hosts and a plurality of flash storage devices is executed via a network device.

FIG. 3 shows a modified example of the system configuration shown in FIG. 1.

In FIG. 3, data transfer between a plurality of hosts 2A and a plurality of flash storage devices 3 is executed via a network device (network switch 1).

In a computing system shown in FIG. 3, the storage management function of the server 2 shown in FIG. 1 is moved to a manager 2B, and the front-end function of the server 2 is moved to the hosts (hosts for end user services) 2A.

The manager 2B manages a plurality of flash storage devices 3, and allocates storage resources of the flash storage devices 3 to each of the hosts (hosts for end user services) 2A in response to a request from each of the hosts (hosts for end user services) 2A.

Each of the hosts (hosts for end user services) 2A is connected to at least one end user terminal 61 via a network. Each of the hosts (hosts for end user services) 2A manages a lookup table (LUT) which is the above-explained integrated (merged) logical-to-physical address translation table. Each of the hosts (hosts for end user services) 2A manages the only mapping between each of the logical addresses used by the corresponding end user and each of the physical addresses of the resource allocated to the own self by using the own LUT. Therefore, this configuration can easily scale out the system.

The global FTL of each of the hosts 2 comprises a function of managing the lookup table (LUT), a function of implementing high availability, a de-duplication function, a QoS policy control function, and the like.

The manager 2B is a device (computer) exclusive for managing the flash storage devices 3. The manager 2B comprises a global resource reservation function of reserving the storage resource of the amount required by each of the hosts 2A. Furthermore, the manager 2B comprises a ware monitoring function of monitoring the degree of wear of each of the flash storage devices 3, a NAND resource allocation function of allocating the reserved storage resource (NAND resource) to each of the hosts 2A, a QoS policy control function, a global clock management function, and the like.

Each of the flash storage devices 3 comprises the local FTL. The local FTL is a function of cooperating with the global FTL of each of the hosts 2A. The local FTL may comprise the QoS control function, a function of managing a write buffer of each of the QoS domains, a function of executing the GC data copy in the QoS domains or between the QoS domains, a LUT copy function for recovery, a function of managing a reference count used for de-duplication, a work load analysis function, a housekeeping function, and the like.

According to the system configuration shown in FIG. 3, since the management of each of the flash storage devices 3 is executed by the manager 2B, each of the hosts 2A needs only to execute an operation of transmitting the I/O request to at least one flash storage device 3 allocated to the own host and an operation of receiving a response from the flash storage device 3. In other words, the data transfer between the hosts 2A and the flash storage devices 3 is executed via the only switch 1 and a manager 2B is not related with the data transfer. In addition, the contents of LUT managed by each of the hosts 2A are independent of each other as explained above. Therefore, since the number of hosts 2A can easily be increased, the scale-out system configuration can be implemented.

FIG. 4 shows a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising a plurality of memory cells arrayed in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 is formed of a number of pages (pages P0 to Pn−1 in this case). The blocks BLK0 to BLKm−1 function as erase units. The blocks may be referred to as "erase blocks", "physical blocks" or "physical erase blocks". Each of the pages P0 to Pn−1 comprises a plurality of memory cells connected to the same word line. The pages P0 to Pn−1 are units for a data write operation and a data read operation.

The controller 4 is electrically connected to the NAND flash memory 5 which is a nonvolatile memory, via a NAND interface 13 such as toggle or open NAND flash interface (ONFI). The controller 4 is a memory controller (control circuit) configured to control the NAND flash memory 5.

As illustrated in FIG. 5, the NAND flash memory 5 comprises a plurality of NAND flash memory dies. Each of the NAND flash memory dies is a nonvolatile memory die comprising a memory cell array comprising a plurality of blocks BLK and a peripheral circuit which controls the memory cell array. The individual NAND flash memory dies can operate independently. For this reason, the NAND flash memory dies function as parallel operation units. The NAND flash memory dies are referred to as "NAND flash memory chips" or "nonvolatile memory chips". FIG. 5 illustrates a case where sixteen channels Ch1, Ch2, . . . Ch16 are connected to the NAND interface 13 and the same number (for example, two dies per channel) of NAND flash memory dies are connected to each of the channels Ch1, Ch2, . . . Ch16. Each of the channels comprises a communication line (memory bus) for communication with the corresponding NAND flash memory dies.

The controller 4 controls NAND flash memory dies #1 to #32 via the channels Ch1, Ch2, . . . Ch16. The controller 4 can simultaneously drive the channels Ch1, Ch2, . . . Ch16.

Sixteen NAND flash memory dies #1 to #16 connected to the channels Ch1 to Ch16 may be formed as a first bank, and remaining sixteen NAND flash memory dies #17 to #32 connected to the channels Ch1 to Ch16 may be formed as a second bank. The banks function as units of causing a plurality of memory modules to be operated in parallel by bank interleaving. In the configuration example shown in FIG. 5, a maximum of thirty-two NAND flash memory dies can be operated in parallel by sixteen channels and the bank interleaving using two banks.

In the present embodiments, the controller 4 may manage a plurality of blocks (hereinafter called superblocks) each of which includes a set of blocks BLK, and may execute the erase operation in units of superblocks.

The superblocks are not limited to these but may include a total of thirty-two blocks BLK selected from the NAND flash memory dies #1 to #32, respectively. Each of the NAND flash memory dies #1 to #32 may have a multiplane configuration. For example, if each of the NAND flash memory dies #1 to #32 has the multiplane configuration including two planes, one superblock may include a total of sixty-four blocks BLK selected from sixty-four planes corresponding to the NAND flash memory dies #1 to #32, respectively. FIG. 6 illustrates a case where one superblock SB is composed of a total of thirty-two blocks BLK (i.e., the blocks BLK surrounded by a thick frame in FIG. 5) selected from the NAND flash memory dies #1 to #32, respectively.

As shown in FIG. 4, the controller 4 comprises a host interface 11, a CPU 12, a NAND interface 13, a DRAM interface 14, and the like. The CPU 12, the NAND interface 13, and the DRAM interface 14 are interconnected via a bus 10.

The host interface 11 is a host interface circuit configured to execute communication with the host 2. The host interface 11 may be, for example, a PCIe controller (NVMde controller). The host interface 11 receives various requests (commands) from the host 2. The requests (commands) include a write request (write command), a read request (read command), and the other various requests (commands).

The CPU 12 is a processor configured to control the host interface 11, the NAND interface 13, and the DRAM interface 14. The CPU 12 loads a control program (firmware) from the NAND flash memory 5 or a ROM (not shown) to the DRAM 6 in response to power-on of the flash storage device 3 and executes various processing by executing the firmware. The firmware may be loaded to SRAM (not shown) in the controller 4. The CPU 12 can execute command processing for processing various commands from the host 2, and the like. Operations of the CPU 12 are controlled by the above-explained firmware executed by the CPU 12. A part or all the command processing may be executed by exclusive hardware in the controller 4.

The CPU 12 can function as a write operation control unit 21, a read operation control unit 22, and a GC operation control unit 23. An application program interface (API) for implementing the system configuration shown at the right part of FIG. 2 is installed in the write operation control unit 21, the read operation control unit 22, and the GC operation control unit 23.

The write operation control unit 21 receives the write request (write command) designating the logical address from the host 2. The logical address is an identifier capable of identifying data (user data) to be written and may be, for example, LBA or a tag such as a key of a key-value store. When the write operation control unit 21 receives the write command, the write operation control unit 21 first determines the block (write destination block) to which the data should be written from the host 2 and a location (write destination location) in the block. Next, the write operation control unit 21 writes the data (write data) from the host 2 to the write destination location of the write destination block. In this case, the write operation control unit 21 can write not only the data from the host 2, but also the data and the logical address of the data to the write destination block.

Then, the write operation control unit 21 returns to the host 2 the designated logical address and a physical address indicating the location (physical location) in the NAND flash memory 5 to which the data (write data) is written.

In this case, the physical address is represented by (1) the block number of the write destination block, and (2) an in-block offset indicating the write destination location in the write destination block. The block number is an identifier designating the block to which the data is written. Various numbers that can uniquely identify an arbitrary one of the blocks can be used as the block number.

The in-block offset is indicative of an offset from the beginning (leading part) of the write destination block to the write destination location, i.e., an offset of the write destination location to the leading part of the write destination block. The size of the offset from the leading part of the write destination block to the write destination location is represented by a multiple of the grain having the size different from the page size. The grain is the above-explained access unit. The maximum value of the size of the grain is restricted to the block size. In other words, the in-block offset represents the offset from the leading part of the write destination block to the write destination location by a multiple of the grain having the size different from the page size.

The grain may have the size smaller than the page size. For example, if the page is 16K bytes, the size of the grain may be 4K bytes. In this case, a plurality of offset locations each having the size of 4K bytes are defined in a certain block. The in-block offset corresponding to the first offset location in the block is, for example, 0, the in-block offset corresponding to the next offset location in the block is, for example, 1, and the in-block offset corresponding to the further next offset location in the block is, for example, 2.

Alternatively, the grain may have the size larger than the page size. For example, the grain may have the size which is several times as large as the page size. If the page is 16K bytes, the grain may have the size of 32K bytes.

Thus, the write operation control unit 21 determines both of the block to which data should be written and a location in this block by itself, and notifies the host 2 of not the block number or the page number, but the block number and the in-block offset as the physical address indicative of the location to which the data (user data) has been written from the host 2. The host 2 can thereby write the user data to the NAND flash memory 5 without considering the block size, restrictions on page write order, bad pages, page size, and the like, and can further map the physical address represented by the block number and the in-block offset to the logical address of the user data.

When the read operation control unit 22 receives the read request (read command) to designate the physical address (i.e., the block number and the in-block offset) from the host 2, the read operation control unit 22 reads the data from the NAND flash memory 5, based on the block number and the in-block offset. The block to be read is specified by the block number. The physical location to be read in the block is specified by the in-block offset. The host 2 does not need to handle the page sizes different in each generation of the NAND flash memories, by using the in-block offset.

To obtain the physical location to be read, the read operation control unit 22 may first divide the in-block offset by the number of grains (4 in this case) indicative of the page size, and determine a quotient and a remainder obtained by the division as the page number to be read and the in-page offset to be read, respectively.

When the GC operation control unit 23 executes the garbage collection of the NAND flash memory 5, the GC operation control unit 23 selects the copy source block (GC source block) and the copy destination block (GC destination block) for the garbage collection from the blocks in the NAND flash memory 5. In this case, the GC operation control unit 23 generally selects a plurality of copy source blocks (GC source blocks) and at least one copy destination block (GC destination block). A condition (GC policy) for selecting the copy source blocks (GC source blocks) may be designated by the host 2. For example, a GC policy of selecting the block in which the valid data amount is the smallest as the copy source block (GC source block) in priority may be used or the other GC policy may be used. Thus, the selection of the copy source block (GC source block) and the copy destination block (GC destination block) is executed by not the host 2, but the controller 4 (GC operation control unit 23) of the flash storage device 3. The controller 4 may manage the valid data amount of each of the blocks by using each of the block management blocks.

When the GC operation control unit 23 receives a command (GC control command) to designate the copy source group (source QoS domain) and the copy destination group (destination QoS domain) of the garbage collection from the host 2, the GC operation control unit 23 selects the copy source block of the garbage collection from the block group belonging to the copy source group, and selects the copy destination block of the garbage collection from the block group belonging to the copy destination group.

Management of valid data/invalid data may be executed by using the block management table 32. The block management table 32 may exist in, for example, each of the blocks. In the block management table 32 corresponding to a certain block, plural bit map flags corresponding to plural data included in this block are stored. Each of bit map flags indicates validity/invalidity of the data corresponding to the bit map flag. The valid data means data which is referred to from the LUT (i.e., data linked to a certain logical address as the latest data) and which may be subsequently read by the host 2. The invalid data means data which no longer has a possibility of being read from the host 2. For example, data associated with a certain logical address is valid data, and data associated with no logical address is invalid data.

The GC operation control unit 23 determines a location (copy destination location) in the copy destination block (GC destination block) to which the valid data stored in the copy source block (GC source block) should be written, and copies the valid data to the determined location (copy destination location) of the copy destination block (GC destination block). In this case, the GC operation control unit 23 may copy both of the valid data and the logical address of the valid data to the copy destination block (GC destination block). The GC operation control unit 23 may specify the valid data in the GC source block by referring to the block management table 32 corresponding to the copy source block (GC source block). Alternatively, management of the valid data/invalid data may be executed by the host 2 in the other embodiment. In this case, the GC operation control unit 23 may receive information indicating validity/invalidity of each of the data in the GC source block and specify the valid data in the GC source block, based on the received information.

Then, the GC operation control unit 23 notifies the host 2 of the logical address of the copied valid data, the block number of the copy destination block (GC destination block), and the in-block offset which represents the offset from the leading part of the copy destination block (GC destination block) to the copy destination location by the above-explained multiple of the grain.

In the present embodiments, as explained above, the write operation control unit 21 can write both of the data (write data) from the host 2 and the logical data from the host 2 to the write destination block. For this reason, since the GC operation control unit 23 can easily acquire the logical address of each of the data in the copy source block (GC source block) from the copy source block (GC source block), the GC operation control unit 23 can easily notify the host 2 of the logical address of the copied valid data.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used to store the write buffer (WB) 31. In addition, the other part of the storage region in the DRAM 6 is utilized to store the block management table 32. The write buffer (WB) 31 and the block management table 32 may be stored in SRAM (not shown) in the controller 4.

FIG. 7 shows a write command applied to the flash storage device 3.

The write command is a command to request the flash storage device 3 to write the data. The write command may include the command ID, the QoS domain ID, the logical address, the length, and the like.

The command ID is an ID (command code) indicating that this command is the write command, and the command ID for the write command is included in the write command.

The QoS domain ID is an identifier capable of uniquely identifying the QoS domain to which the data should be written. A write command transmitted from the host 2 in response to a write request from a certain end user may include the QoS domain ID designating the QoS domain corresponding to the end user. The namespace ID may be handled as the QoS domain ID.

The logical address is an identifier for identifying write data which should be written. The logical address may be LBA or a key of a key-value store as explained above. If the logical address is LBA, the logical address (starting LBA) included in the write command is indicative of a logical location (first logical location) to which the write data should be written.

The length is indicative of the length of the write data to be written. This length (data length) may be designated by the number of grains or the number of LBA, or the size may be designated by bytes.

As explained above, the controller 4 can classify a number of blocks in the NAND flash memory 5 into groups (QoS domains) such that each of a number of blocks in the NAND flash memory 5 belongs to only one group. Then, the controller 4 can manage a free block list (free block pool) and an active block list (active block pool) for each group (QoS domain).

The state of each block is generally classified into an active block which stores valid data and a free block which does not store valid data. Each of the blocks which are the active blocks is managed by an active block list. In contrast, each of the blocks which are the free blocks is managed by a free block list.

When the controller 4 receives the write command from the host 2, the controller 4 determines the block (write destination block) to which the data from the host 2 should be written and a location in the write destination block (write destination location). The controller 4 may determine one of free blocks belonging to the QoS domain corresponding to the QoS domain ID as the write destination block. The write destination location is determined in consideration of the restrictions on page write order, the bad pages, and the like. Then, the controller 4 writes the data from the host 2 to the write destination location in the write destination block.

If the whole write destination block is filled with the user data, the controller 4 moves the write destination block to the active block list (active block pool). Then, the controller 4 selects again the free block from the free block list corresponding to the QoS domain, and allocates the selected free block as a new write destination block.

If the number of remaining free blocks managed by the free block list is lower than or equal to a threshold value determined by a predetermined policy or if an instruction to execute the garbage collection is sent from the host 2, the controller 4 may start the garbage collection of this QoS domain.

In the garbage collection of this QoS domain, the controller 4 selects a copy source block (GC source block) and a copy destination block (GC destination block) from the active block group corresponding to the QoS domain. Which block is selected as a GC candidate (copy source block) may be determined under the above-explained policy designated by the host 2 or may be designated by the host 2. It the block is selected under the policy, for example, the block having the smallest valid data amount may be selected as the GC candidate (copy source block).

FIG. 8 shows a response to the write command shown in FIG. 7.

This response includes a logical address, a physical address, and a length.

The logical address is the logical address included in the write command shown in FIG. 7.

The physical address is indicative of a physical location in the NAND flash memory 5 to which data corresponding to the write command shown in FIG. 7 has been written. In the present embodiments, the physical address is designated by not a combination of the block number and the page number, but a combination of the block number and the offset (in-block offset) as explained above. The block number is an identifier which can uniquely identify an arbitrary one of all the blocks in the flash storage device 3. If different block numbers are assigned to all the blocks, the block numbers may be used directly. Alternatively, the block number may be represented by a combination of the die number and the in-die block number. The length is indicative of the length of the write data to be written. This length (data length) may be designated by the number of grains or the number of LBA, or the size may be designated by bytes.

FIG. 9 shows Trim command applied to the flash storage device 3.

The Trim command is a command including the block number and the in-block offset indicative of the physical location in which data to be invalidated is stored. In other words, the Trim command can designate not the logical address such as LBA, but the physical address. The Trim command includes the command ID, the physical address, and the length.

The command ID is an ID (command code) indicating that this command is the Trim command, and the command ID for Trim command is included in the Trim command.

The physical address is indicative of a first physical location to which the data to be invalidated is stored. In the present embodiments, the physical address is designated by a combination of the block number and the offset (in-block offset).

The length is indicative of the length of the data to be invalidated. This length (data length) may be designated by the number of grains or bytes.

The controller 4 manages a flag (bit map flag) indicating validity/invalidity of each of the data included in the respective blocks, by using the block management table 32. If the controller 4 receives from the host 2 the Trim command including the block number and the offset (in-block offset) indicative of the physical location in which the data to be invalidated is stored, the controller 4 updates the block management table 32, and changes the flag (bit map flag) corresponding to the data of the physical location corresponding to the block number and the in-block offset included in the Trim command to a value indicative of invalidity.

FIG. 10 shows the block numbers and offsets which define the physical address.

The block number designates a certain block BLK. Each of the blocks BLK includes the pages (page 0 to page n) as shown in FIG. 10.

In a case where the page size (user data storing area of each page) is 16K bytes and the grain is the size of 4 KB, this block BLK is logically divided into 4x(n+1) areas.

Offset +0 is indicative of a first 4 KB area of page 0, offset +1 is indicative of a second 4 KB area of page 0, offset +2 is indicative of a third 4 KB area of page 0, and offset +3 is indicative of a fourth 4 KB area of page 0.

Offset +4 is indicative of a first 4 KB area of page 1, offset +5 is indicative of a second 4 KB area of page 1, offset +6 is indicative of a third 4 KB area of page 1, and offset +7 is indicative of a fourth 4 KB area of page 1.

FIG. 11 shows a relationship between a write operation preformed in response to a write command and a return value included in a response to the write command.

The controller 4 of the flash storage device 3 manages the free blocks including no valid data by the free block list, and selects a block (free block) from the free blocks and allocates the selected block as a write destination block. It is assumed that the block BLK#1 is allocated as the write destination block. The controller 4 writes the data to the block BLK#1 in page units, in order of page 0, page 1, page 2, . . . page n.

In FIG. 11, it is assumed that the write command designating the logical address (LBAx) and the length (=4) has been received from the host 2 in a state in which 16K-byte data have already been written to page 0 of block BLK#1. The controller 4 determines page 1 of block BLK#1 as the write destination location, and writes the 16K-byte write data received from the host 2 to page 1 of block BLK#1. The controller 4 returns a response (logical address, block number, offset (in-block offset), and length) to the write command to the host 2. In this case, the logical address is LBAx, the block number is BLK#1, the offset (in-block offset) is +5, and the length is 4.

Figure 12:
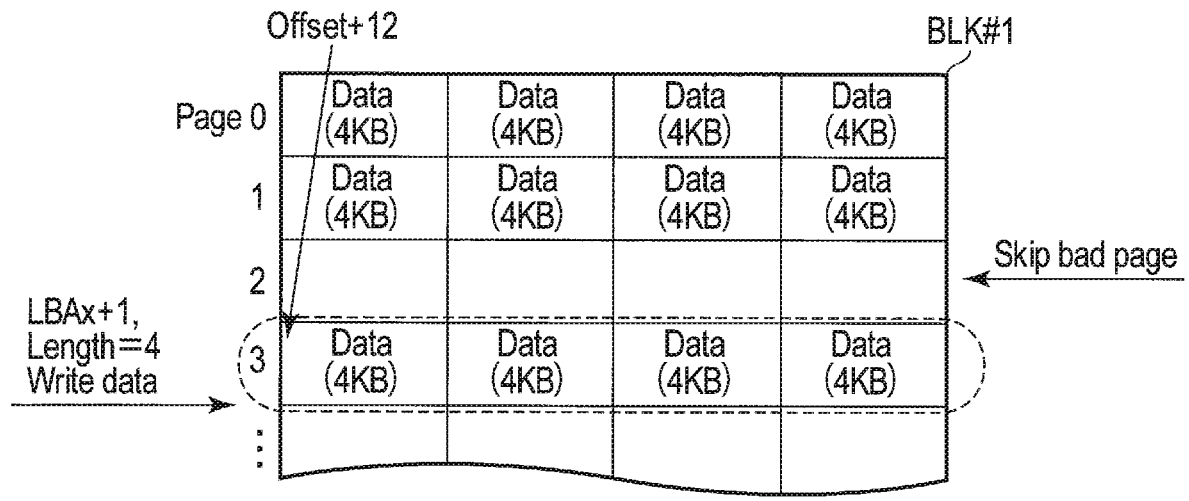
FIG. 12 is a block diagram for explanation of a write operation which skips a defective page.

FIG. 12 shows a write operation for skipping the defective page (bad page).

In FIG. 12, it is assumed that the write command designating the logical address (LBAx+1) and the length (=4) has been received from the host 2 in a state in which the data have been written to page 0 and page 1 of block BLK#1. If page 2 of block BLK#1 is the defective page, the controller 4 determines page 3 of block BLK#1 as the write destination location and writes the 16K-byte write data received from the host 2 to page 3 of block BLK#1. The controller 4 returns a response (logical address, block number, offset (in-block offset), and length) to the write command to the host 2. In this case, the logical address is LBAx+1, the block number is BLK#1, the offset (in-block offset) is +12, and the length is 4.

Figure 13:
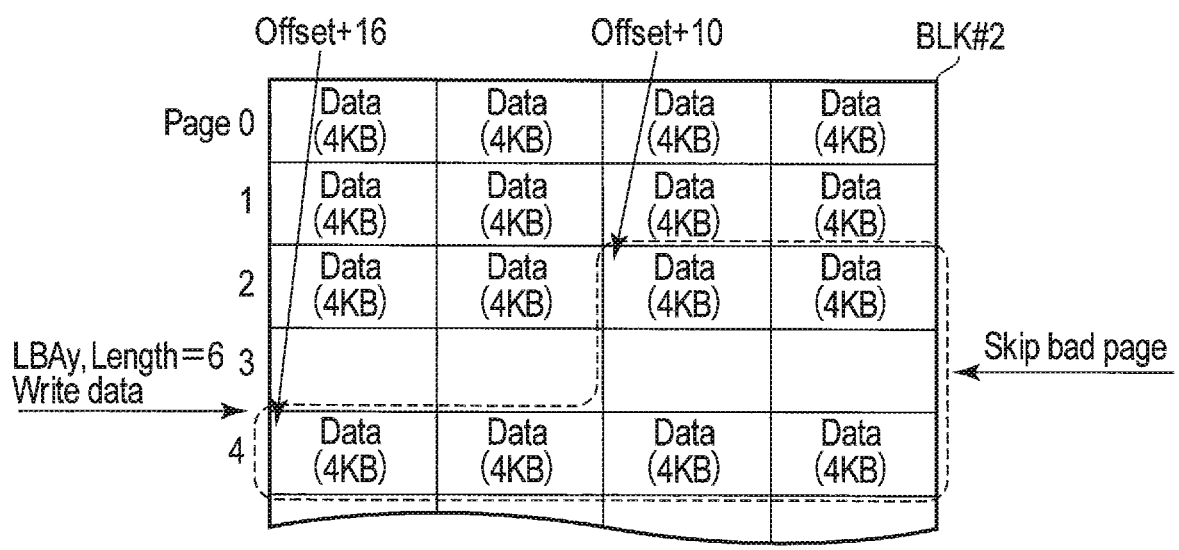
FIG. 13 is a block diagram for explanation of another example of the write operation which skips a defective page.

FIG. 13 shows another example of the write operation for skipping the defective page.

In FIG. 13, it is assumed that the data is written across two pages sandwiching the defective page. It is assumed that data have been written to page 0 and page 1 of block BLK#2 and that unwritten 8K-byte write data remain in the write buffer 31. If the write command designating the logical address (LBAy) and the length (=6) is received in this state, the controller 4 prepares 16K-byte write data corresponding to the page size by using the unwritten 8K-byte write data and first 8K-byte write data in 24K-byte write data newly received from the host 2. Then, the controller 4 writes the prepared 16K-byte write data to page 2 of block BLK#2.

If next page 3 of block BLK#2 is the defective page, the controller 4 determines page 4 of block BLK#2 as the next write destination location and writes remaining 16K-byte write data in the 24K-byte write data received from the host 2 to page 4 of block BLK#2.

The controller 4 returns a response (logical address, block number, offset (in-block offset), and length) to the write command to the host 2. In this case, this response may include LBAy, the block number (=BLK#2), the offset (=+10), the length (=2), the block number (=BLK#2), the offset (=+16), and the length (=4).

Figure 14:
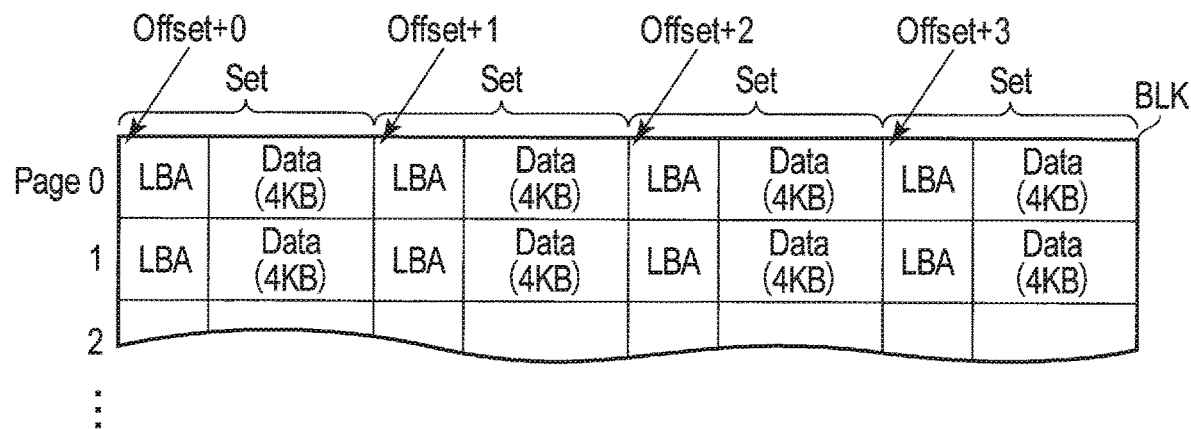
FIG. 14 is a block diagram for explanation of an operation of writing a pair of a logic address and data to a page in a block.
Figure 15:
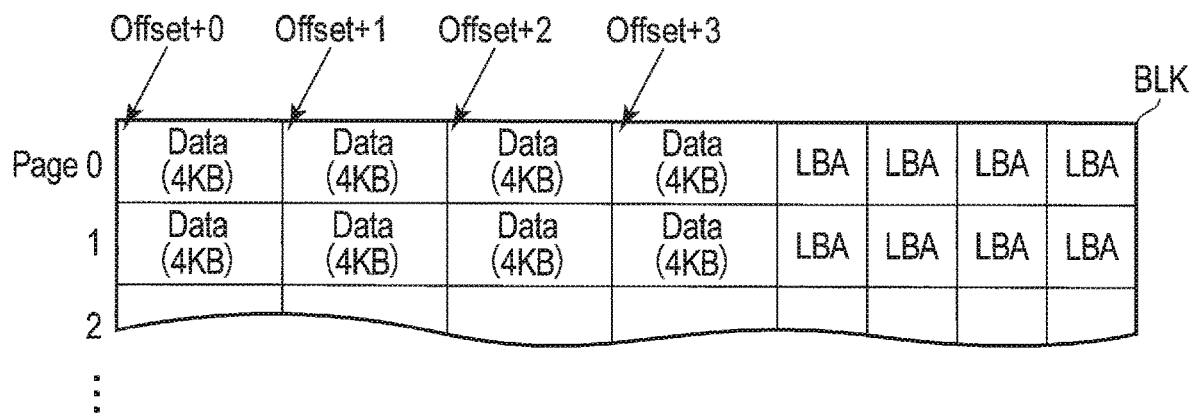
FIG. 15 is a block diagram for explanation of an operation of writing data in a user data area of the page and writing the logic address of the data to a redundant area of the page.

FIG. 14 and FIG. 15 show an operation of writing a pair of the logical address and the data to a page in the block.

In each of the blocks, each page may include a user data area for storing the user data and a redundant area for storing the management data. The page size is over 16 KB.

The controller 4 writes both of 4 KB user data and the logical address (for example, LBA) corresponding to the 4 KB user data to the write destination block BLK. In this case, as shown in FIG. 14, four data sets each including LBA and the 4 KB user data may be written to the same page. The in-block offset may be indicative of the set boundary.

Alternatively, as shown in FIG. 15, four 4 KB user data may be written to user data areas in the page and four LBAs corresponding to these 4 KB user data may be written to redundant areas in this page.

FIG. 16 shows a relationship between the block number and the offset (in-block offset) in a case of using a super block. The in-block offset is also referred to as offset, simply, in the following explanations.

To simplify the drawing, one superblock SB#1 is assumed to be composed of four blocks BLK#11, BLK#21, BLK#31, and BLK#41. The controller 4 writes the data in order of page 0 of block BLK#11, page 0 of block BLK#21, page 0 of block BLK#31, page 0 of block BLK#41, page 1 of block BLK#11, page 1 of block BLK#21, page 1 of block BLK#31, page 1 of block BLK#41, . . . .

Offset +0 is indicative of a first 4 KB area of page 0 of block BLK#11, offset +1 is indicative of a second 4 KB area of page 0 of block BLK#11, offset +2 is indicative of a third 4 KB area of page 0 of block BLK#11, and offset +3 is indicative of a fourth 4 KB area of page 0 of block BLK#11.

Offset +4 is indicative of a first 4 KB area of page 0 of block BLK#21, offset +5 is indicative of a second 4 KB area of page 0 of block BLK#21, offset +6 is indicative of a third 4 KB area of page 0 of block BLK#21, and offset +7 is indicative of a fourth 4 KB area of page 0 of block BLK#21.

Similarly, offset +12 is indicative of a first 4 KB area of page 0 of block BLK#41, offset +13 is indicative of a second 4 KB area of page 0 of block BLK#41, offset +14 is indicative of a third 4 KB area of page 0 of block BLK#41, and offset +15 is indicative of a fourth 4 KB area of page 0 of block BLK#41.

Offset +16 is indicative of a first 4 KB area of page 1 of block BLK#11, offset +17 is indicative of a second 4 KB area of page 1 of block BLK#11, offset +18 is indicative of a third 4 KB area of page 1 of block BLK#11, and offset +19 is indicative of a fourth 4 KB area of page 1 of block BLK#11.

Offset +20 is indicative of a first 4 KB area of page 1 of block BLK#21, offset +21 is indicative of a second 4 KB area of page 1 of block BLK#21, offset +22 is indicative of a third 4 KB area of page 1 of block BLK#21, and offset +23 is indicative of a fourth 4 KB area of page 1 of block BLK#21.

Similarly, offset +28 is indicative of a first 4 KB area of page 1 of block BLK#41, offset +29 is indicative of a second 4 KB area of page 1 of block BLK#41, offset +30 is indicative of a third 4 KB area of page 1 of block BLK#41, and offset +31 is indicative of a fourth 4 KB area of page 1 of block BLK#41.

For example, if 4K-byte data corresponding to a write command designating certain LBA (LBAx) is written to the location corresponding to offset +8, the controller 4 may return the logical address (=LBAx), the block number (=SB#1), the offset (=+8), and the length (=1) to the host 2 as the response to the write command.

FIG. 17 shows a sequence of write operation processing executed by the host 2 and the flash storage device 3.

The host 2 transmits the write command including the QoS domain ID, LBA, and the length to the flash storage device 3. When the controller 4 of the flash storage device 3 receives the write command, the controller 4 determines the write destination block to which the data should be written from the host 2 and a location in the write destination block. More specifically, the controller 4 selects a free block from the free block list and allocates the selected free block as a write destination block (step S11). In other words, the selected free block and the first available page in the selected free block are determined as the write destination block to which the write data should be written from the host 2 and the location in the write destination block. If the write destination block has been allocated, the write destination block allocation processing in step S11 does not need to be executed. A next available page in the allocated write destination block is determined as a location in the write destination block to which the write data should be written from the host 2.

The controller 4 may manage a plurality of free block lists corresponding to a plurality of QoS domains. In the free block list corresponding to a certain QoS domain, the only block group reserved for this QoS domain needs only to be registered. In this case, in step S11, the controller 4 may select the free block list corresponding to the QoS domain designated by the QoS domain ID of the write command, select one of free blocks from the selected free block list, and allocate the selected free block as the write destination block. The data corresponding to different QoS domains can be thereby prevented from existing together in the same block.

The controller 4 writes the write data received from the host 2 to the write destination block (step S12). In step S12, the controller 4 writes both of the logical address (LBA) and the write data to the write destination block.

Figures 18, 19:
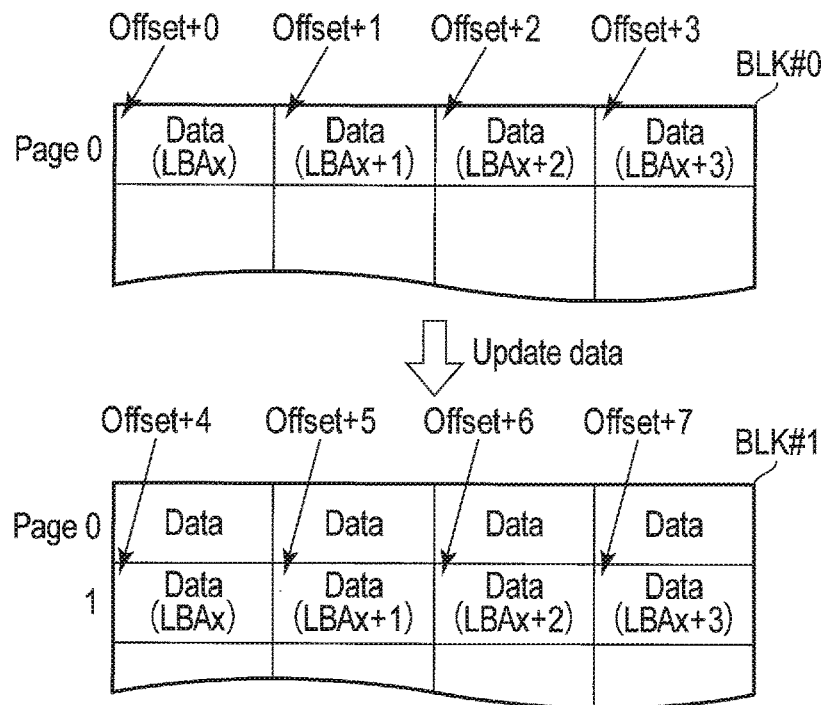
FIG. 18 is a block diagram showing a data update operation of writing update data for already written data.
FIG. 19 is a diagram for explanation of an operation of updating a block management table managed by the flash storage device according to the embodiments.

The controller 4 updates the block management table 32, and changes a bit map flag corresponding to the written data (i.e., a bit map flag corresponding to the physical address of the physical location to which the data has been written) from 0 to 1 (step S13). It is assumed that as shown in FIG. 18, for example, 16K-byte update data in which start LBA is LBAx are written to the physical locations corresponding to offsets +4 to +7 of block BLK#1. In this case, as shown in FIG. 19, each of the bit map flags corresponding to offsets +4 to +7 is changed from 0 to 1 in the block management table for block BLK#1.

The controller 4 returns a response to the write command to the host 2 (step S14). For example, as shown in FIG. 18, if the 16K-byte update data in which start LBA is LBAx are written to the physical locations corresponding to offsets +4 to +7 of block BLK#1, the response including LBAx, the block number (=BLK1), the offset (=+4), and the length (=4) is transmitted to the host 2 from the controller 4.

When the host 2 receives this response, the host 2 updates LUT managed by the host 2 and maps the physical address to each of the logical addresses corresponding to the written write data. As shown in FIG. 20, LUT includes a plurality of entries corresponding to the respective logical addresses (for example, LBA). In an entry corresponding to a certain logical address (for example, certain LBA), physical address PBA indicative of the location (physical location) in the NAND flash memory 5 in which the data corresponding to LBA is stored, i.e., the block number and the offset (in-block offset) are stored. As shown in FIG. 18, if the 16K-byte update data in which start LBA is LBAx are written to the physical locations corresponding to offsets +4 to +7 of block BLK#1, LUT is updated, BLK#1 and offset +4 are stored in the entry corresponding to LBAx, BLK#1 and offset +5 are stored in the entry corresponding to LBAx+1, BLK#1 and offset +6 are stored in the entry corresponding to LBAx+2, and BLK#1 and offset +7 are stored in the entry corresponding to LBAx+3 as shown in FIG. 20.

After that, the host 2 transmits the Trim command to invalidate previous data which become unnecessary due to write of the above update data, to the flash storage device 3 (step S21). As shown in FIG. 18, if the previous data are stored in the locations corresponding to offset +0, offset +1, offset +2, and offset +3 of block BLK#0, the Trim command designating the block number (=BLK#0), the offset (=+0), and the length (=4) is transmitted from the host 2 to the flash storage device 3 as shown in FIG. 21. The controller 4 of the flash storage device 3 updates the block management table 32 in response to the Trim command (step S15). In step S15, as shown in FIG. 21, each of the bit map flags corresponding to offsets +0 to +3 is changed from 1 to 0 in the block management table for block BLK#0.

FIG. 22 shows a read command applied to the flash storage device 3.

The read command is a command to request the flash storage device 3 to read the data. The read command includes the command ID, the physical address PBA, the length, and the transfer destination pointer.

The command ID is an ID (command code) indicating that this command is the read command, and the command ID for the read command is included in the read command.

The physical address PBA is indicative of a first physical location from which the data should be read.

The physical address PBA is designated by the block number and the offset (in-block offset).

The length is indicative of the length of the data to be read. The data length can be designated by the number of grains.

The transfer destination pointer is indicative of the location on the memory in the host 2 to which the read data is to be transferred.

One read command can designate a plurality of sets of the physical addresses PBA (block numbers and offsets) and the lengths.

FIG. 23 shows a read operation.

It is assumed here that the read command designating the block number (=BLK#2), the offset (=+5), and the length (=3) is received from the host 2. The controller 4 of the flash storage device 3 reads data d1 to d3 from BLK#2, based on the block number (=BLK#2), the offset (=+5), and the length (=3). In this case, the controller 4 reads the data for one page size from page 1 of BLK#2 and extracts data d1 to data d3 from the read data. Next, the controller 4 transfers data d1 to data d3 on a host memory designated by a transfer destination pointer.

FIG. 24 shows an operation of reading data portions stored in respective different physical locations in response to the read command from the host 2.

It is assumed here that the read command designating the block number (=BLK#2), the offset (=+10), the length (=2), the block number (=BLK#2), the offset (=+16), and the length (=4) is received from the host 2. The controller 4 of the flash storage device 3 reads data of one page size from page 2 of BLK#2, based on the block number (=BLK#2), the offset (=+10), and the length (=2), and extracts data d1 to d2 from the read data. Next, the controller 4 reads data (data d3 to data d4) of one page size from page 4 of BLK#2, based on the block number (=BLK#2), the offset (=+16), and the length (=4). Then, the controller 4 transfers the read data of the length (=6) obtained by combining data d1 to data d2 with data d3 to data d4, to the host memory designated by a transfer destination pointer in the read command.

Thus, even if a defective page is included in the block, the data part can be read from a separate physical location without causing a read error. In addition, even if data is written across two blocks, the data can be read by issuing one read command.

FIG. 25 shows a sequence of read processing executed by the host 2 and the flash storage device 3.

The host 2 translates the logical address included in the read request from the user application into the block number and the offset by referring to LUT managed by the host 2. Then, the host 2 transmits the read command designating the block number, the offset, and the length to the flash storage device 3.

When the controller 4 of the flash storage device 3 receives the read command from the host 2, the controller 4 determines the block corresponding to the block number designated by the read command as the block to be read, and determines the page to be read, based on the offset designated by the read command (step S31). In step S31, the controller 4 may first divide the offset designated by the read command by the number (4 in this case) of the grains indicative of the page size. Then, the controller 4 may determine a quotient and a remainder obtained by the division as the page number to be read and the in-page offset location to be read, respectively.

The controller 4 reads the data defined by the block number, the offset, and the length from the NAND flash memory 5 (step S32) and transmits the read data to the host 2.

FIG. 26 shows a GC control command applied to the flash storage device 3.

The GC control command may include the command ID, the policy, the source QoS domain ID, the destination QoS domain ID, and the like.

The command ID is the ID (command code) indicating that this command is the GC control command, and the command ID for the GC control command is included in the GC control command.

The policy is the policy indicating the condition (GC policy) for selecting the GC candidate block (GC source block). The controller 4 of the flash storage device 3 supports a plurality of GC policies.

The GC policy supported by the controller 4 may include a policy (greedy) that the block of a small valid data amount is selected with priority as the GC candidate block (GC source block).

In addition, the GC policy supported by the controller 4 may include a policy that the block in which data (cold data) of a low update frequency are collected is selected as the GC candidate block (GC source block) with higher priority than the block in which data (hot data) of a high update frequency are collected.

Furthermore, the GC policy may designate the GC start condition. The GC start condition may be indicative of, for example, the number of the remaining free blocks.

The controller 4 manages the block group including the valid data by the active block list and, if GC is executed, the controller 4 selects at least one GC candidate block (GC source block) from the block group managed by the active block list, based on the GC policy designated by the GC control command.

The source QoS domain ID is a parameter indicating which QoS domain should be the GC source. The controller 4 selects at least one GC candidate block (GC source block) from the block group belonging to the QoS domain designated by the source QoS domain ID, i.e., the active block list corresponding to the QoS domain.

The destination QoS domain ID is a parameter indicating which QoS domain should be the GC destination. The controller 4 can select at least one free block in the free block group belonging to the QoS domain designated by the destination QoS domain ID as the GC destination block.

The source QoS domain ID and the destination QoS domain ID may designate the same QoS domain or designate QoS domains different from each other. In other words, each of the source QoS domain ID and the destination QoS domain ID is a parameter designating arbitrary one of the QoS domains.

If the number of remaining free blocks corresponding to the source QoS domains is smaller than equal to a threshold value designated by the policy, the controller 4 may start GC. If the controller 4 receives a GC control command including a policy designating compulsory execution of GC, the controller 4 may immediately start GC when the controller 4 receives the GC control command from the host 2.

FIG. 27 shows a callback command for GC.

The callback command for GC is used to notify the host 2 of the logical address of the valid data copied by GC, and the block number and the offset indicating the copy destination location of the valid data.

The callback command for GC may include the command ID, the logical address, the length, a destination physical address, and a source physical address (optional).

The command ID is the ID (command code) indicating that this command is the callback command for GC, and the command ID for the callback command for GC is included in the callback command for GC.

The logical address is indicative of a logical address of the valid data copied from the GC source block to the GC destination block by GC.

The length is indicative of the length of the copied data. The data length may be designated by the number of grains.

The destination physical address is indicative of a location in the GC destination block in which the valid data has been copied. The destination physical address is designated by the block number and the offset (in-block offset).

The source physical address (optional) is indicative of a location in the GC destination block in which the valid data has been stored. The source physical address is designated by the block number and the offset (in-block offset).

FIG. 28 shows a procedure of the garbage collection (GC) operation.

The controller 4 of the flash storage device 3 selects at least one GC source block (copy source block) including a mixture of valid data and invalid data from the block group belonging to the QoS domain designated by the source QoS domain ID, based on the policy designated by the host 2 (step S41). Next, the controller 4 selects at least one free block from the free block group belonging to the QoS domain designated by the destination QoS domain ID and allocates the selected free block as the GC destination block (copy destination block) (step S42).

The controller 4 copies all the valid data in the GC source block (copy source block) to the GC destination block (copy destination block) (step S44). In step S44, the controller 4 copies not only the valid data in the GC source block (copy source block) but also both of the valid data and the logical address corresponding to the valid data from the GC source block (copy source block) to the GC destination block (copy destination block). A pair of the data and the logical address can be thereby held in the GC destination block (copy destination block).

Then, the controller 4 notifies the host 2 of the logical address of the copied valid data and the destination physical address (block number and offset (in-block offset)) indicative of the location in the GC destination block (copy destination block) by using the callback command for GC (step S44). In step S44, the controller 4 may notify the host 2 of not only the destination physical address and the logical address of the copied valid data, but also the source physical address.

When the host 2 receives this callback command for GC, the host 2 updates LUT managed by the host 2 and maps the destination physical address to each of the logical addresses corresponding to the copied valid data (step S51).

FIG. 29 shows an example of a data copy operation executed for GC.

In FIG. 29, it is assumed that the valid data (LBA=10) stored in the location corresponding to offset +4 of the GC source block (block BLK#50 in this case) is copied to the location corresponding to offset +0 of the GC destination block (block BLK#100 in this case) and that the valid data (LBA=20) stored in the location corresponding to offset +10 of the GC source block (block BLK#50 in this case) is copied to the location corresponding to offset +1 of the GC destination block (block BLK#100 in this case). In this case, the controller 4 notifies the host of {LBA10, BLK#100, offset (=+0), LBA20, BLK#100, and offset (=+1)}(callback processing for GC).

FIG. 30 shows contents of LUT of the host 2 updated based on a result of the data copy operation shown in FIG. 29.

In the LUT, the block number and the offset corresponding to LBA 10 are updated from BLK#50 and offset (=+4) to BLK#100 and offset (=+0). Similarly, the block number and the offset corresponding to LBA 20 are updated from BLK#50 and offset (=+10) to BLK#100 and offset (=+1).

After LUT is updated, the host 2 may transmit the Trim command designating BLK#50 and offset (=+4) to the flash storage device 3 and invalidate data stored in the location corresponding to offset (=+4) of BLK#50. Furthermore, the host 2 may transmit the Trim command designating BLK#50 and offset (=+10) to the flash storage device 3 and invalidate data stored in the location corresponding to offset (=+10) of BLK#50.

Figure 31:
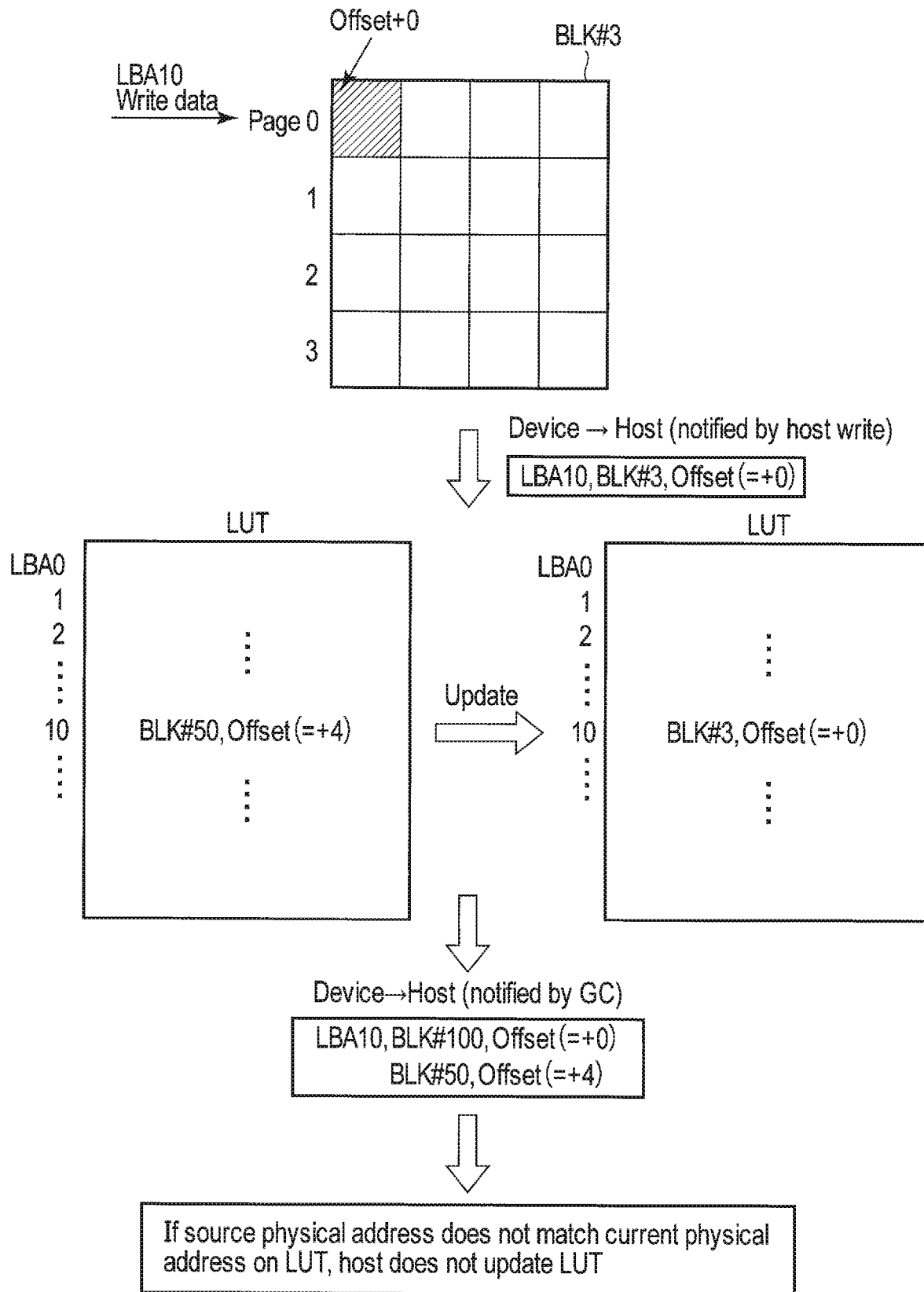
FIG. 31 is a diagram for explanation of a relationship between the response to the write command and the callback processing for GC.

FIG. 31 shows a relationship between the response to the write command and the callback processing for GC.

When the controller 4 is copying the valid data corresponding to certain logical address, the write command designating this logical address is often received by the host 2.

In FIG. 31, it is assumed that the write command designating LBA10 has been received from the host 2 during execution of the data copy operation (data copy operation corresponding to LBA10) shown in FIG. 29.

The controller 4 writes the write data received from the host 2 to the write destination block (i.e., to the location corresponding to offset +0 of BLK#3). Then, the controller 4 notifies the host 2 of {LBA10, BLK#3, and offset (=+0)}.

The host 2 updates LUT and changes the block number and the offset corresponding to LBA 10 from BLK#50 and offset (=+4) to BLK#3 and offset (=+0).

After this, if the controller 4 notifies the host 2 of the destination physical address of LBA 10, the block number and the offset (BLK#3 and offset (+0)) indicative of the location where the latest data corresponding to LBA 10 is stored may be erroneously changed to the destination physical address (BLK#100 and offset (+0) in this case) corresponding to LBA 10.

In the present embodiments, the controller 4 can notify the host 2 of not only LBA 10 and the destination physical address (BLK#100 and offset (+0)), but also the source physical address (BLK#50 and offset (+4)). If the source physical address (BLK#50 and offset (+4)) does not match the block number and the offset currently mapped to LBA 10 by LUT, the host 2 does not update LUT. Thus, the block number and the offset (BLK#3 and offset (+0)) indicative of the location where the latest data corresponding to LBA 10 is stored can be prevented from being erroneously changed to the destination physical address (BLK#100 and offset (+0) in this case) corresponding to LBA 10.

FIG. 32 shows another example of the GC control command.

The GC control command shown in FIG. 32 may designate a pair of the source device ID and the source QoS domain ID, instead of the source QoS domain ID. Furthermore, the GC control command shown in FIG. 32 may designate a pair of the destination device ID and the destination QoS domain ID, instead of the destination QoS domain ID. Thus, a certain flash storage device 3 can be operated as the GC source and the other flash storage device 3 can be operated as the GC destination. If the source device ID and the destination device ID are the same, GC is executed in one flash storage device 3.

FIG. 33 shows an example of the callback command for GC corresponding to the GC control command shown in FIG. 32.

The callback command for GC shown in FIG. 33 includes a pair of the destination device ID and the destination physical address, instead of the destination physical address. In addition, the callback command for GC shown in FIG. 33 may include a pair (optional) of the source device ID and the source physical address, instead of the source physical address (optional).

It is assumed that the device ID operates one flash storage device 3 as the GC source and that the device ID operates two flash storage devices 3 as GC destinations. The host 2 may transmit the GC control command designating source device ID #1 and destination device ID #2 to the flash storage device 3 of the device ID #1 and the flash storage device 3 of the device ID #2.

The flash storage device 3 of device ID#1 selects the GC source block from the block group belonging to the QoS domain designated by the source QoS domain ID, and transmits the valid data in the GC source block and the logical address of the valid data to the flash storage device (i.e., flash storage device of device ID #2) designated by the destination device ID. The valid data in the GC source command and the logical address of the valid data are transferred, for example, from the flash storage device 3 of the device ID #1 to the flash storage device 3 of the device ID #2 via the switch 1 shown in FIG. 3.

The flash storage device 3 of the device ID #2 select the GC destination block from the free block group belonging to the QoS domain designated by the destination QoS domain ID, and writes (copies) the valid data and the logical address received via the switch 1 to the GC destination block.

The flash storage device 3 of the device ID #2 notifies the host 2 of the logical address of the copied valid data and the destination physical address (the block number and the offset) to which the valid data is copied, by the callback command for GC.

The flash storage device 3 of the device ID #1 notifies the host 2 of the logical address of the copied valid data and the destination physical address (the block number and the offset) to which the valid data is copied, by the callback command for GC.

Figure 34:
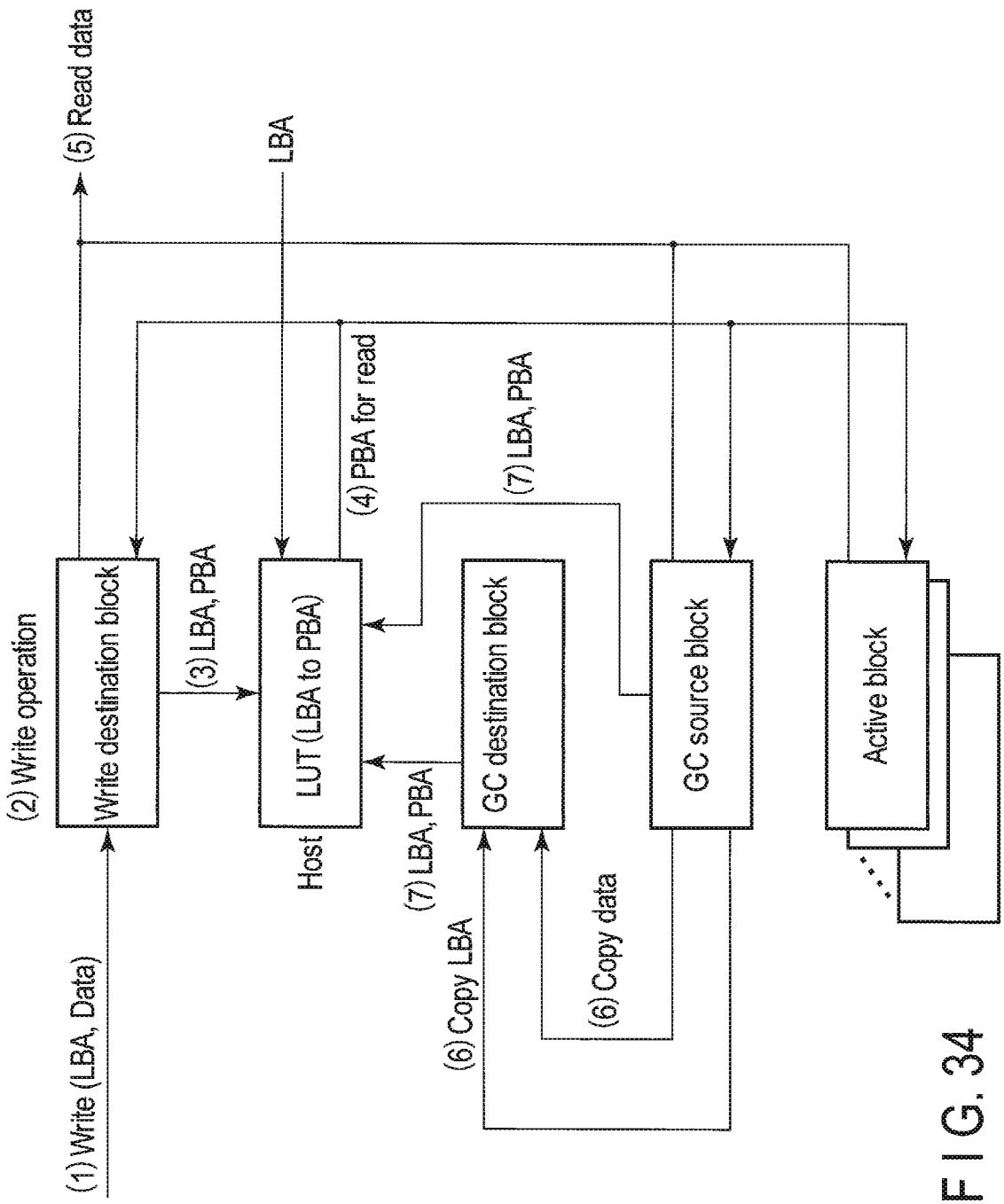
FIG. 34 is a block diagram for explanation of the write/read/GC operations executed by the flash storage device according to the embodiments.

FIG. 34 shows the write/read/GC operation.

First, a host write operation of writing the data from the host 2 will be explained.

(1) The controller 4 receives LBA and the write data from the host 2.

(2) The controller 4 writes both of LBA and the write data to the write destination block. If the write destination block is not allocated, the controller 4 selects one of the free blocks from the free block list and allocates the selected free block as a new write destination block. Then, the controller 4 writes both of LBA and the write data to the new write destination block.

(3) The controller 4 notifies the host 2 of the LBA and the physical address PBA indicating the location in the write destination block to which the write data is written. The physical address PBA is represented by the block number and the offset. If the whole write destination block is filled with the data, the controller 4 registers the write destination block to the active block list.

Next, the read operation will be explained.

(4) The host 2 translates LBA included in the read request from the user application into the physical address PBA (block number and offset) for LBA by referring to LUT managed by the host 2.

(5) On the basis of the physical address PBA (block number and offset) for read received from the host 2, the controller 4 determines the block having the block number as the block to be read. The block to be read is any one of the block groups (active blocks) managed by the active block list, the current GC source block, or the current write destination block. Then, the controller 4 reads the data from the block to be read, based on the offset.

Next, the GC operation will be explained.

(6) The controller 6 selects the GC source block (copy source block) and the GC destination block (copy destination block) and copies both of the valid data stored in the GC source block and LBA of the valid data to the GC destination block.

(7) The controller 4 notifies the host 2 of both of LBA of the copied valid data and PBA (block number and offset) indicative of the location in the GC destination block in which the valid data has been copied.

Alternatively, the controller 4 may notify the host 2 of LBA of the copied valid data, PBA (block number and offset) indicative of the location in the GC destination block in which the valid data has been copied, and PBA (block number and offset) indicative of the location in the GC source block in which the valid data is stored.

FIG. 35 shows a configuration example of the block management table for management of a reference count.

The host 2 supports the de-duplication function. Therefore, if the duplicate data matching the data requested to be written by the user application has existed in the flash storage device 3 (NAND flash memory 5), the host 2 does not write the data to the flash storage device 3, but associates a pointer alone indicative of the location (block number and offset) in which the data is stored with LBA of the data requested to be written. For this reason, each of 4K-byte data stored in the flash storage device 3 (NAND flash memory 5) may not be referred to by one logical address, but by a plurality of logical addresses.

In the present embodiments, the flash storage device 3 comprises a function of managing the reference count for every 4K-byte data. The reference count corresponding to certain data is indicative of the number of logical addresses referring to the data.

An example of the block management table for block BLK#1 is shown in FIG. 35.

The block management table for block BLK#1 includes a plurality of entries corresponding to the offset values of block BLK#1, respectively.

For example, the reference count corresponding to 4 KB data stored in the location corresponding to offset +0 of block BLK#1 is stored in the entry corresponding to offset +0. Similarly, the reference count corresponding to 4 KB data stored in the location corresponding to offset +1 of block BLK#1 is stored in the entry corresponding to offset +1.

Data in which the reference count is 1 or more is valid data, and data in which the reference count is 0 is invalid data.

The flash storage device 3 increments/decrements the reference count, based on the duplicate command/Trim command received from the host 2.

FIG. 36 shows a duplicate command applied to the flash storage device 3 for management of the reference count.

The duplicate command is a command to request the flash storage device 3 to increment the reference count of the data stored in a certain physical address (block number and offset) by 1.

The duplicate command may include the command ID, the physical address PBA, the length, and the like.

The command ID is an ID (command code) indicating that this command is the duplicate command, and the command ID for the duplicate command is included in the duplicate command.

The physical address PBA is indicative of a first physical location where the data in which the reference count should be incremented by 1 is stored. The physical address PBA is designated by the block number and the offset (in-block offset).

The length is indicative of the length of the data in which the reference count should be incremented by 1. The data length can be designated by the number of grains.

If the controller 4 receives the duplicate command including the block number and the in-block offset indicative of the physical location where the data in which the reference count should be incremented is stored, from the host 2, the controller 4 updates the block management table 32, and increments the reference count corresponding to the data of the physical location corresponding to the block number and the in-block offset included in the duplicate command.

FIG. 37 shows the Trim command applied to the flash storage device 3 for management of the reference count.

The Trim command is a command to request the flash storage device 3 to decrement the reference count of the data stored in a certain physical address (block number and offset) by 1.

The Trim command may include the command ID, the physical address PBA, the length, and the like.

The command ID is an ID (command code) indicating that this command is the Trim command, and the command ID for Trim command is included in the Trim command.

The physical address PBA is indicative of a first physical location where the data in which the reference count should be decremented by 1 is stored. The physical address PBA is designated by the block number and the offset (in-block offset).

The length is indicative of the length of the data in which the reference count should be decremented by 1. The data length can be designated by the number of grains.

If the controller 4 receives the Trim command including the block number and the in-block offset indicative of the physical location where the data in which the reference count should be decremented is stored, from the host 2, the controller 4 updates the block management table 32, and decrements the reference count corresponding to the data of the physical location corresponding to the block number and the in-block offset included in the Trim command.

FIG. 38 shows reference count increment/decrement processing.

When the controller 4 of the flash storage device 3 receives the duplicate command from the host 2, the controller 4 increments the reference count corresponding to the physical address PBA (block number and offset) designated by the duplicate command, i.e., the reference count corresponding to the data stored in the physical location in the NAND flash memory 5 designated by the block number and the offset, by 1 (step S61). In this case, the controller 4 updates the block management table 32 corresponding to the block having the block number designated by the duplicate command. In updating of the block management table 32, the reference count stored in the entry in the block management table 32 corresponding to the offset designated by the duplicate command is incremented by 1. If the length designated by the duplicate command is 2 or more, not only the reference count corresponding to the offset designated by the duplicate command, but also the reference count corresponding to several offsets following the offset are incremented by 1.

When the controller 4 of the flash storage device 3 receives the Trim command from the host 2, the controller 4 decrements the reference count corresponding to the physical address PBA (block number and offset) designated by the Trim command, i.e., the reference count corresponding to the data stored in the physical location in the NAND flash memory 5 designated by the block number and the offset, by 1 (step S62). In this case, the controller 4 updates the block management table 32 corresponding to the block having the block number designated by the Trim command. In updating of the block management table 32, the reference count stored in the entry in the block management table 32 corresponding to the offset designated by the Trim command is decremented by 1. If the length designated by the Trim command is 2 or more, not only the reference count corresponding to the offset designated by the Trim command, but also the reference count corresponding to several offsets following the offset are decremented by 1.

In GC, the controller 4 refers to the block management table corresponding to the GC source block and determines whether the data in the GC source block is valid data or invalid data in the data unit having the size of 4 KB. The controller 4 determines that the data in which the reference count is 0 is invalid data and that the data in which the reference count is 1 or more is valid data. Then, the controller 4 copies the valid data (i.e., the data in which the reference count is 1 or more) and the logical address corresponding to the valid data from the GC source block to the GC destination block.

More specifically, when the controller 4 executes the garbage collection of the NAND flash memory 5, the controller 4 selects the copy source block and the copy destination block for the garbage collection. The controller 4 copies both of the first data (valid data) in which the reference count is 1 or more and the logical address of the first data, which are stored in the copy source block, to the copy destination block. Then, the controller 4 notifies the host 2 of the logical address of the first data, the block number of the copy destination block, and the in-block offset indicating the offset location from the leading part of the copy destination block by a multiple of the grain.

According to the present embodiments, as explained above, not the host 2, but the flash storage device 3 determines the write destination block to which the data (user data) should be written from the host 2 and the location in the write destination block (write destination location). The flash storage device 3 writes the user data to the write destination location in the write destination block, and notifies the host 2 of the block number of the write destination block, and the in-block offset indicating the offset from the leading part of the write destination block to the write destination location by a multiple of the grain having the size different from the page size. The host 2 can thereby write the user data to the NAND flash memory 5 without considering the block size, restrictions on page write order, bad pages, page size, and the like, and can further map the physical address (abstracted physical address) represented by the block number and the in-block offset to the logical address of the user data.

Thus, in the configuration in which the flash storage device 3 determines the write destination block and the location in the write destination block and returns the block number and the in-block offset to the host 2, merging the application-level address translation table of the upper tier (host 2) and the LUT-level address translation table of the conventional SSD can be implemented, and the flash storage device 3 can control the NAND flash memory 5 by considering the characteristic/restriction of the NAND flash memory 5. Therefore, appropriate role sharing between the host 2 and the flash storage device 3 can be implemented, and improvement of the I/O performance of the whole system including the host 2 and the flash storage device 3 can be thereby attempted.

In addition, according to the present embodiments, not the host 2 managing the address translation table, but the flash storage device 3 selects the copy source block and the copy destination block for the garbage collection, and copies the valid data stored in the copy source block to the copy destination block. Then, the flash storage device 3 notifies the host 2 of the logical address of the copied valid data, the block number of the copy destination block, and the in-block offset indicating the location in the copy destination block in which the valid data is copied. Thus, since the garbage collection executed by the flash storage device 3 and the flash storage device 3 notifies the host 2 of the logical address, the block number, and the in-block offset, the host 2 can correctly manage mapping between each of the logical addresses and each of the physical addresses (i.e., pairs of the block numbers and the in-block offsets) of the NAND flash memory 5, by using the address translation table (LUT). In addition, since the application level GC can be merged with GC of the flash storage device 3, the write amplification can be remarkably reduced.

The flash storage device 3 may be utilized as one of a plurality of flash storage devices 3 provided in the storage array. The storage array may be connected to the information processing device such as a server computer via a cable or a network. The storage array comprises a controller which controls the flash storage devices 3 in the storage array. If the flash storage devices 3 are applied to the storage array, the controller of the storage array may function as the host 2 of the flash storage devices 3.

In addition, in the present embodiments, the NAND flash memory has been explained as an example of a nonvolatile memory. However, the functions of the present embodiments are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory including a plurality of memory dies, each of the plurality of memory dies including a plurality of blocks, each of the plurality of blocks being a unit for an erase operation; and
a controller electrically connected to the nonvolatile memory and configured to:
classify the plurality of memory dies into a plurality of domains such that each of the plurality of memory dies belongs to only one domain;
in response to receiving a write command from the host, the write command requesting to write first data and specifying an identifier of a domain among the plurality of domains to which the first data is to be written, select a domain associated with the specified identifier, select a first block to which the first data is to be written, from the plurality of blocks included in one of the plurality of memory dies belonging to the selected domain, and
write the first data to a first location of the first block.

2. The memory system according to claim 1, wherein the write command further specifies a logical address associated with the first data but does not specify an identifier of the first block.

3. The memory system according to claim 2, wherein the controller is further configured to notify the host of the first location by using at least the identifier of the first block.

4. The memory system according to claim 3, wherein the controller is configured to notify the host of the first location by using the identifier of the first block and an identifier of the one of the plurality of memory dies belonging to the selected domain.

5. The memory system according to claim 3, wherein the controller is configured to notify the host of the first location by using an offset address in the first block and the identifier of the first block.

6. The memory system according to claim 5, wherein each of the plurality of blocks includes a plurality of pages, each of the plurality of pages being a unit for a write operation, and
the controller is configured to specify the offset address by using a multiple of a grain, a size of the grain being different from a size of each of the plurality of pages.

7. The memory system according to claim 1, wherein the controller is further configured to:
in response receiving a read command from the host, the read command specifying at least an identifier of the first block, read the first data from the first location of the first block.

8. The memory system according to claim 7, wherein the read command further specifies the first location by using an offset address in the first block but does not specify a logical address associated with the first data.

9. The memory system according to claim 1, wherein the controller is further configured to:
copy the first data and a logical address associated with the first data to a second location of a second block of the nonvolatile memory; and
notify the host of the second location by using at least an identifier of the second block.

10. The memory system according to claim 1, wherein the controller is further configured to:
write a logical address associated with the first data to the first block.

11. A method of controlling a nonvolatile memory, the nonvolatile memory including a plurality of memory dies, each of the plurality of memory dies including a plurality of blocks, each of the plurality of blocks being a unit for an erase operation, said method comprising:
classifying the plurality of memory dies into a plurality of domains such that each of the plurality of memory dies belongs to only one domain;
in response to receiving a write command from a host, the write command requesting to write first data and specifying an identifier of a domain among the plurality of domains to which the first data is to be written,
selecting a domain associated with the specified identifier, selecting a first block to which the first data is to be written, from the plurality of blocks included in one of the plurality of memory dies belonging to the selected domain, and writing the first data to a first location of the first block.

12. The method according to claim 11, wherein the write command further specifies a logical address associated with the first data but does not specify an identifier of the first block.

13. The method according to claim 12, further comprising:

notifying the host of the first location by using at least the identifier of the first block.

14. The method according to claim 13, further comprising:

notifying the host of the first location by using the identifier of the first block and an identifier of the one of the plurality of memory dies belonging to the selected domain.

15. The method according to claim 13, further comprising:

notifying the host of the first location by using an offset address in the first block and the identifier of the first block.

16. The method according to claim 15, wherein each of the plurality of blocks includes a plurality of pages, each of the plurality of pages being a unit for a write operation, and the offset address is specified by using a multiple of a grain, a size of the grain being different from a size of each of the plurality of pages.

17. The method according to claim 11, further comprising:

in response receiving a read command from the host, the read command specifying at least an identifier of the first block, reading the first data from the first location of the first block.

18. The method according to claim 17, wherein the read command further specifies the first location by using an offset address in the first block but does not specify a logical address associated with the first data.

19. The method according to claim 11, further comprising:

copying the first data and a logical address associated with the first data to a second location of a second block of the nonvolatile memory; and notifying the host of the second location by using at least an identifier of the second block.

20. The method according to claim 11, further comprising:

writing a logical address associated with the first data to the first block.

* * * * *